(12) United States Patent
Valin et al.

(10) Patent No.: US 8,972,282 B2
(45) Date of Patent: Mar. 3, 2015

(54) METHOD FOR TRANSFORMATION OF A WEBSITE

(75) Inventors: David Valin, Flushing, NY (US); Alex Socolof, Briarcliff Manor, NY (US)

(73) Assignee: Adopt Anything, Inc., Briarcliff Manor, NY (US)

( * ) Notice: Subject to any disclaimer, the term of this patent is extended or adjusted under 35 U.S.C. 154(b) by 0 days.

(21) Appl. No.: 13/282,730

(22) Filed: Oct. 27, 2011

(65) Prior Publication Data

US 2012/0041826 A1 Feb. 16, 2012

Related U.S. Application Data

(63) Continuation-in-part of application No. 12/459,353, filed on Jun. 29, 2009.

(51) Int. Cl.
| | |
|---|---|
| G06Q 30/00 | (2012.01) |
| G06Q 30/02 | (2012.01) |
| G06Q 50/18 | (2012.01) |
| G06Q 99/00 | (2006.01) |
| G06Q 40/00 | (2012.01) |

(52) U.S. Cl.
CPC ........ *G06Q 30/0226* (2013.01); *G06Q 30/0239* (2013.01); *G06Q 30/0241* (2013.01); *G06Q 30/0273* (2013.01); *G06Q 30/0276* (2013.01); *G06Q 50/184* (2013.01); *G06Q 99/00* (2013.01); *G06Q 40/12* (2013.01); *G06Q 30/0231* (2013.01); *G06Q 30/0207* (2013.01); *G06Q 30/0214* (2013.01)

USPC .................................................... 705/14.72

(58) Field of Classification Search
USPC .................................................... 705/14.72
See application file for complete search history.

(56) References Cited

U.S. PATENT DOCUMENTS

| | | | | |
|---|---|---|---|---|
| 6,253,188 | B1* | 6/2001 | Witek et al. | 705/14.54 |
| 6,317,718 | B1* | 11/2001 | Fano | 705/14.39 |
| 2001/0037241 | A1* | 11/2001 | Puri | 705/14 |
| 2005/0165642 | A1* | 7/2005 | Brouze et al. | 705/14 |
| 2007/0130015 | A1* | 6/2007 | Starr et al. | 705/14 |

\* cited by examiner

*Primary Examiner* — John G Weiss
*Assistant Examiner* — Scott C Anderson
(74) *Attorney, Agent, or Firm* — White-Welker & Welker, LLC; Matthew T. Welker, Esq.

(57) ABSTRACT

A method for websites to be transformed and repurposed into other forms of design, use, and functions for other purposes, to benefit the original websites, website purposes, and owners of websites. A user would first speak or type into a computer. The GUI is a website campaign manager located on/at a website URL. A user creates a campaign and submits their website URL. The system then information form the website or uses that entered by a user. A data processor module, running on a computer or equivalent machine, assembles the extracted information. The system provides a language selection option where the final product can be created using one or more languages and then published, publically or privately, printed, and submitted for creation. A website campaign or advertisement is created along with a complementary website search software application, which can later be edited.

18 Claims, 22 Drawing Sheets

METHOD FOR TRANSFORMATION OF A WEBSITE

CROSS REFERENCE TO RELATED APPLICATIONS

This application claims priority from and is a continuation in part of U.S. patent application Ser. No. 12/459,353, entitled "Method and mechanism for protection, sharing, storage, accessing, authentication, certification, attachment and tracking anything in an electronic network", filed on Jun. 29, 2009, which is incorporated by reference in its entirety for all purposes as if fully set forth herein.

TECHNICAL FIELD OF THE INVENTION

The present invention generally relates to the field of data processing systems. More specifically the present invention relates to transformation of website content into one or more different embodiments.

BACKGROUND OF THE INVENTION

The World Wide Web, is a network of websites, and each website has its own purpose for being created, but other purposes exist, that enhance the original purpose for websites owners. Websites need ways to be promoted, raise funds, sell things and further their reach in and through other kinds of products and product marketing.

The present invention teaches methods for websites to be transformed and repurposed into other forms of design, use, and functions for other purposes, to benefit the original websites, website purposes, and owners of websites. The present invention also provides for an automatic simple interface method for creating, transforming, and repurposing websites.

Definitions

URL is an abbreviation of Uniform Resource Locator (URL), it is the global address of documents and other resources on the World Wide Web (also referred to as the "Internet").

A "software application" is a program or group of programs designed for end users. Application software can be divided into two general classes: systems software and applications software. Systems software consists of low-level programs that interact with the computer at a very basic level. This includes operating systems, compilers, and utilities for managing computer resources. In contrast, applications software (also called end-user programs) includes database programs, word processors, and spreadsheets. Figuratively speaking, applications software sits on top of systems software because it is unable to run without the operating system and system utilities.

A "software module" is a file that contains instructions. "Module" implies a single executable file that is only a part of the application, such as a DLL. When referring to an entire program, the terms "application" and "software program" are typically used.

A "software application module" is a program or group of programs designed for end users that contains one or more files that contains instructions to be executed by a computer or other equivalent device.

A "virtual world" or "virtual world place" is an online community that often takes the form of a computer-based simulated environment through which users can interact with one another and use and create objects. The term has become largely synonymous with interactive 3D virtual environments, where the users take the form of avatars visible to others. These avatars usually appear as textual, two-dimensional, or three-dimensional representations, although other forms are possible (auditory and touch sensations for example). Some, but not all, virtual worlds allow for multiple users. The computer accesses a computer-simulated world and presents perceptual stimuli to the user, who in turn can manipulate elements of the modeled world and thus experience a degree of tele-presence. Such modeled worlds and their rules may draw from the reality or fantasy worlds.

A "website", also written as Web site, web site, or simply site, is a collection of related web pages containing images, videos or other digital assets. A website is hosted on at least one web server, accessible via a network such as the Internet or a private local area network through an Internet address known as a Uniform Resource Locator (URL). All publicly accessible websites collectively constitute the World Wide Web.

A "web page", also written as webpage is a document, typically written in plain text interspersed with formatting instructions of Hypertext Markup Language (HTML, XHTML). A web page may incorporate elements from other websites with suitable markup anchors.

Web pages are accessed and transported with the Hypertext Transfer Protocol (HTTP), which may optionally employ encryption (HTTP Secure, HTTPS) to provide security and privacy for the user of the web page content. The user's application, often a web browser displayed on a computer, renders the page content according to its HTML markup instructions onto a display terminal. The pages of a website can usually be accessed from a simple Uniform Resource Locator (URL) called the homepage. The URLs of the pages organize them into a hierarchy, although hyperlinking between them conveys the reader's perceived site structure and guides the reader's navigation of the site.

A "mobile device" is a generic term used to refer to a variety of devices that allow people to access data and information from where ever they are. This includes cell phones and other portable devices such as, but not limited to, PDAs, Pads, smartphones, and laptop computers.

"Social network sites" are web-based services that allow individuals to (1) construct a public or semi-public profile within a bounded system, (2) articulate a list of other users with whom they share a connection, and (3) view and traverse their list of connections and those made by others within the system. The nature and nomenclature of these connections may vary from site to site. While we use the terms "social network", "social network pages", and "social network site" to describe this phenomenon, the term "social networking sites" also appears in public discourse, and the variation of terms are often used interchangeably.

"WHOIS" is an Internet service that finds information about a domain name or IP address. If you enter a domain name in a WHOIS search engine, it will scour a huge database of domains and return information about the one you entered. This information typically contains the name, address, and phone number of the administrative, billing, and technical contacts of the domain name. WHOIS can also be used to simply check if a certain domain name is available or if it has already been registered.

SUMMARY OF THE INVENTION

The present invention teaches methods for websites to be transformed and repurposed into other forms of design, use, and functions for other purposes, to benefit the original websites, website purposes, and owners of websites. A user would first speak or type into a computer or equivalent device running the software executing the method, which ties the software comprising the process steps to a computer for execution. The graphical user interface (GUI) is a website campaign manager located on/at a website URL. A user creates a campaign and submits their website URL. The system of the present invention then information form the website or uses that entered by a user.

A data processor module, running on a computer or equivalent machine, assembles the extracted information. The system provides a language selection option where the final product can be created using one or more languages and then published, publically or privately, printed, and submitted for creation. Finally, a website campaign or advertisement is created along with a complementary website search software application, which can later be edited.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION OF THE INVENTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Figure 1:
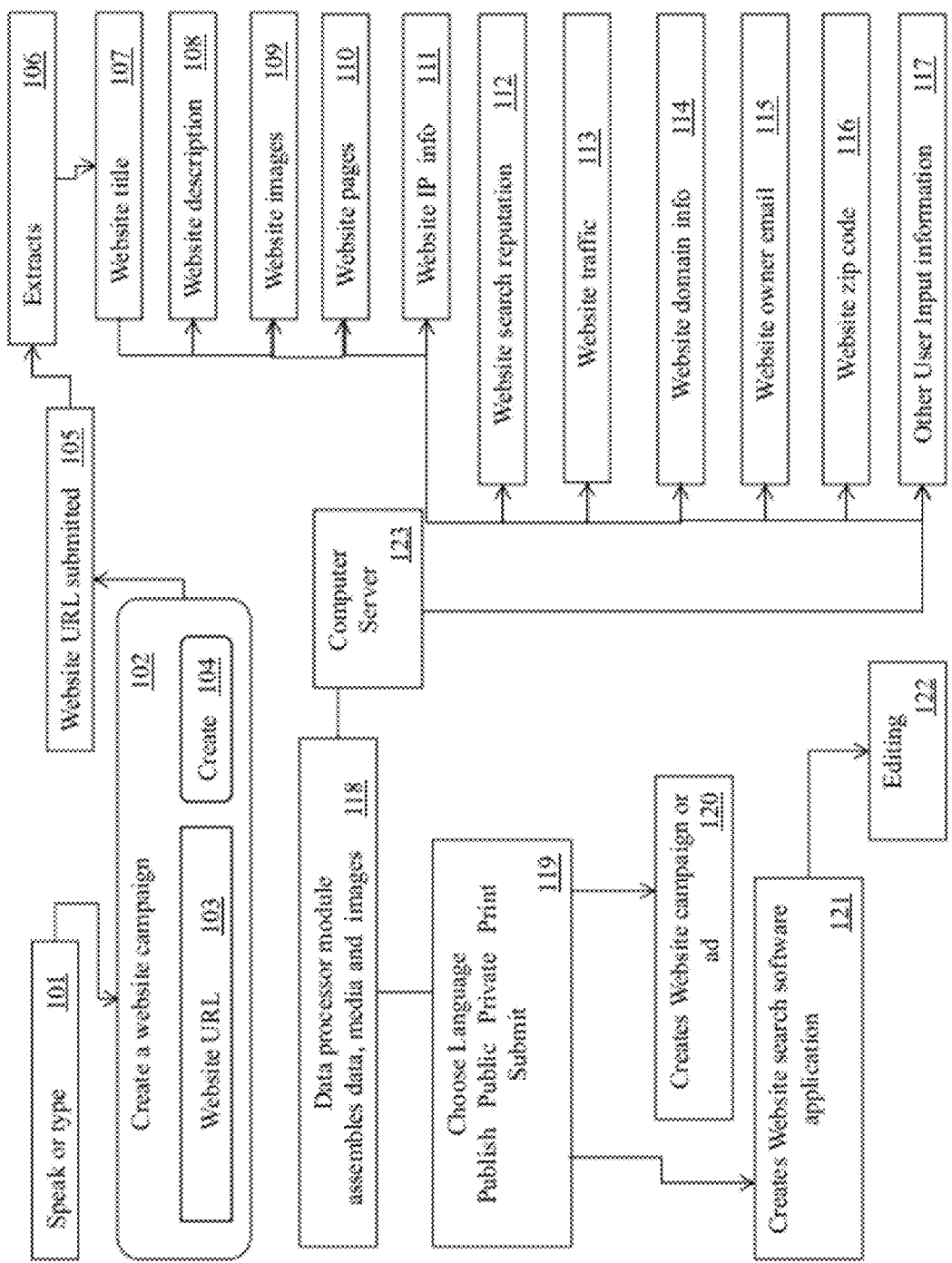
FIG. 1 is a flow chart illustrating the transformation of a website to a campaign.

Now referring to FIG. 1 a flow chart illustrating the transformation of a website to a campaign is shown. A user would first speak or type 101 into a computer or equivalent device running the software executing the method, which ties the software comprising the process steps to a computer for execution. The graphical user interface (GUI) is a website campaign manager 102 located on/at a website URL 103. A user creates a campaign 104 and submits their website URL 105. The system of the present invention then extracts 106 from the URL, the website title 107, description 108, images 109, pages 110, IP information 111, the search reputation 112, traffic 113, domain information 114, owner's email 115, zip code 116, and any other information input by the user 117. Zip codes 116 are extracted from a search made of the administrator of the domain name, through a "WHOIS" search. Reputation 112 is obtained from third party providers of free, global web metrics.

A data processor module 118, running on a computer or equivalent machine, assembles the extracted information on a computer server 123. The system provides a language selection option where the final product can be created using one or more languages and then published, publically or privately, printed, and submitted for creation 119.

Finally, a website campaign or advertisement is created 120 along with a complementary website search software application 121 which can later be edited 122.

Figure 2:
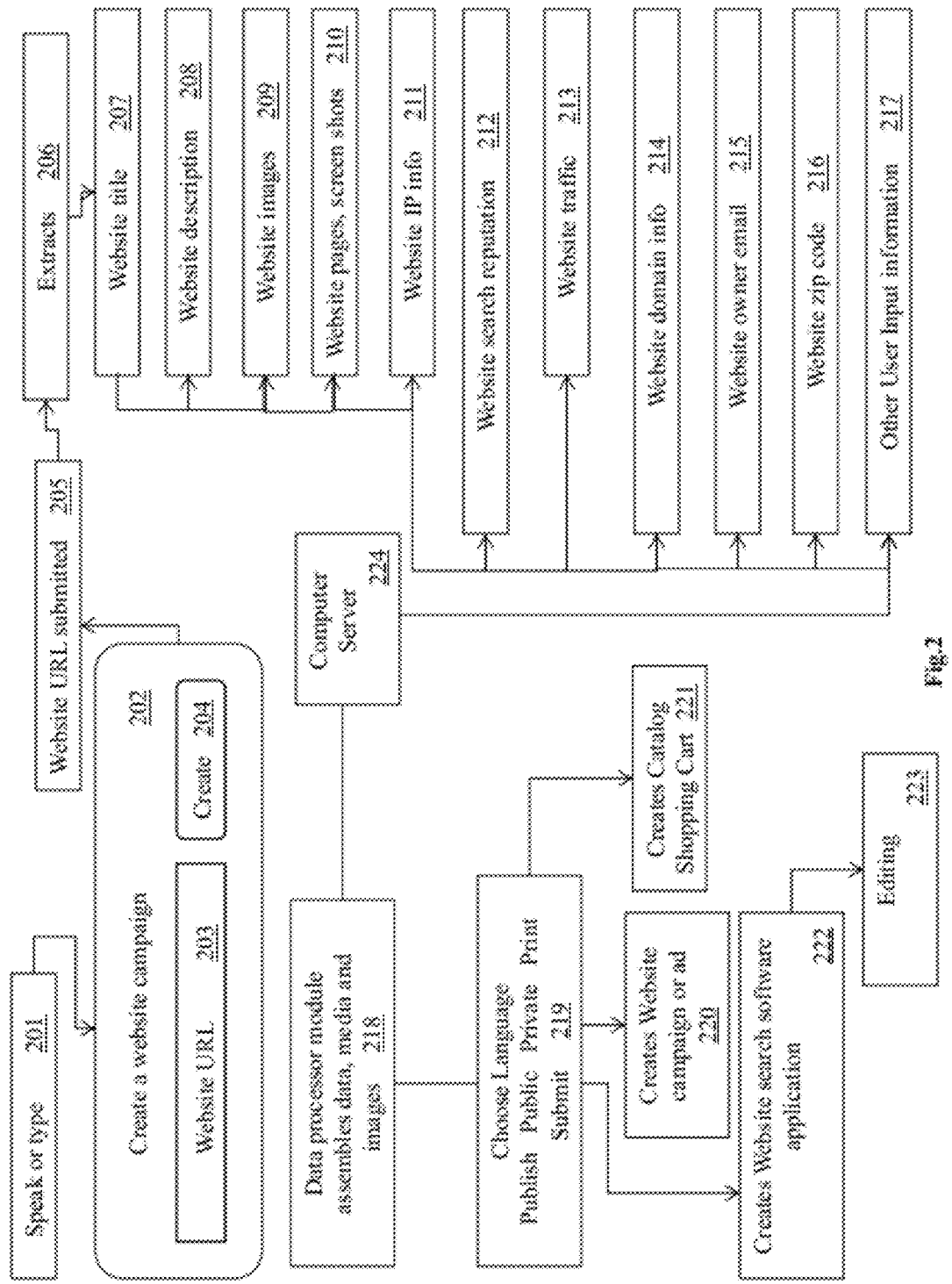
FIG. 2 is a flow chart illustrating the transformation of a website to an advertisement or plurality of advertisements.

FIG. 2 is a flow chart illustrating the transformation of a website to an advertisement or plurality of advertisements. A user would first speak or type 201 into a computer or equivalent device running the software executing the method, which ties the software comprising the process steps to a computer for execution. The graphical user interface (GUI) is a website campaign manager 202 located on/at a website URL 203. A user creates a campaign 204 and submits their website URL 205. The system of the present invention then extracts 206 from the URL, the website title 207, description 208, images 209, pages and screen shots 210, IP information 211, the search reputation 212, traffic 213, domain information 214, owner's email 215, zip code 216, and any other information input by the user 217. Zip codes 216 are extracted from a search made of the administrator of the domain name, through a "WHOIS" search. Reputation 212 is obtained from third party providers of free, global web metrics.

A data processor module 218, running on a computer or equivalent machine, assembles the extracted information on a computer server 224. The system provides a language selection option where the final product can be created using one or more languages and then published, publically or privately, printed, and submitted for creation 219.

Finally, a website campaign or advertisement is created 220 along with a catalog and shopping cart 221 and a complementary website search software application 222, which can later be edited 223.

Figure 3:
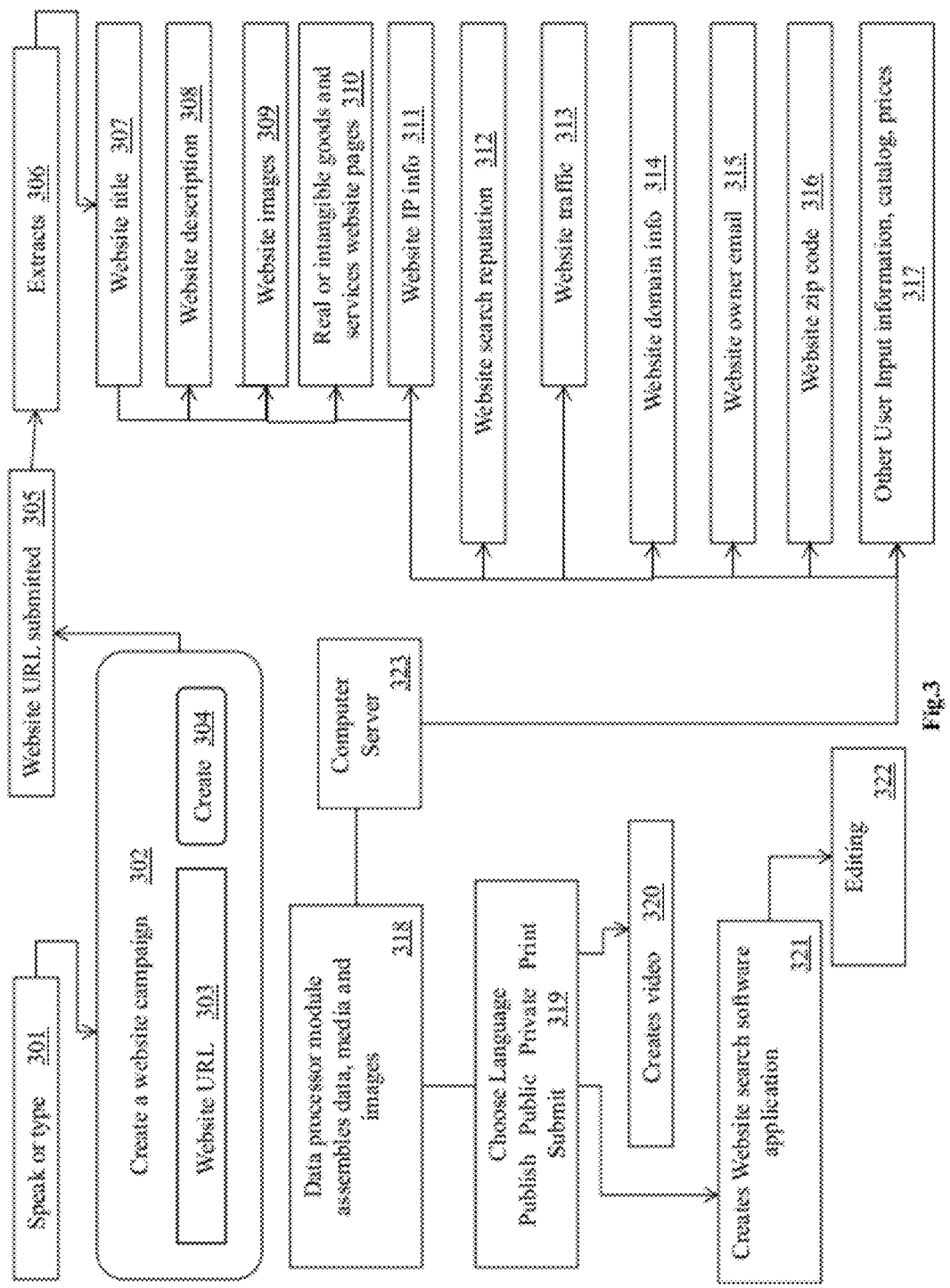
FIG. 3 is a flow chart illustrating the transformation of website to a video.

FIG. 3 is a flow chart illustrating the transformation of website to a video. A user would first speak or type 301 into a computer or equivalent device running the software executing the method, which ties the software comprising the process steps to a computer for execution. The graphical user interface (GUI) is a website campaign manager 302 located on/at a website URL 303. A user creates a campaign 304 and submits their website URL 305. The system of the present invention then extracts 306 from the URL, the website title 307, description 308, images 309, real or intangible good and services website pages 310, IP information 311, the search reputation 312, traffic 313, domain information 314, owner's email 315, zip code 316, and any other information input by the user 317. Zip codes 316 are extracted from a search made of the administrator of the domain name, through a "WHOIS" search. Reputation 312 is obtained from third party providers of free, global web metrics.

A data processor module 318, running on a computer or equivalent machine, assembles the extracted information on a computer server 323. The system provides a language selection option where the final product can be created using one or more languages and then published, publically or privately, printed, and submitted for creation 319.

Finally, a video is created 320 along with a complementary website search software application 321 which can later be edited 322.

Figure 4:
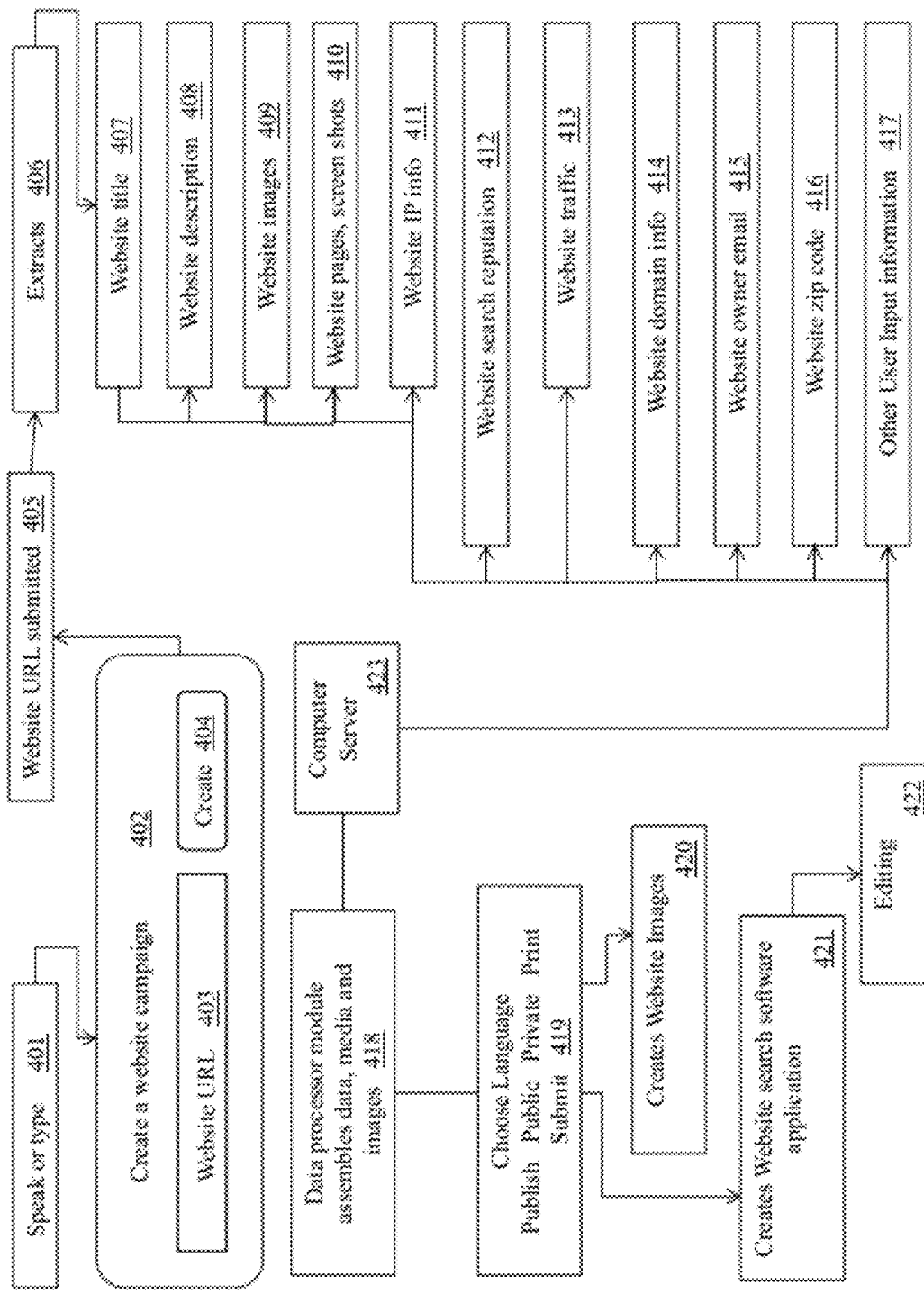
FIG. 4 is a flow chart illustrating the transformation of a website to one or more images.

FIG. 4 is a flow chart illustrating the transformation of a website to one or more images. A user would first speak or type 401 into a computer or equivalent device running the software executing the method, which ties the software comprising the process steps to a computer for execution. The graphical user interface (GUI) is a website campaign manager 402 located on/at a website URL 403. A user creates a campaign 404 and submits their website URL 405. The system of the present invention then extracts 406 from the URL, the website title 407, description 408, images 409, pages and screen shots 410, IP information 411, the search reputation 412, traffic 413, domain information 414, owner's email 415, zip code 416, and any other information input by the user 417. Zip codes 416 are extracted from a search made of the administrator of the domain name, through a "WHOIS" search. Reputation 412 is obtained from third party providers of free, global web metrics.

A data processor module 418, running on a computer or equivalent machine, assembles the extracted information on a computer server 423. The system provides a language selection option where the final product can be created using one or more languages and then published, publically or privately, printed, and submitted for creation 419.

Finally, one or more website images are created 420 along with a complementary website search software application 421 which can later be edited 422.

Figure 5:
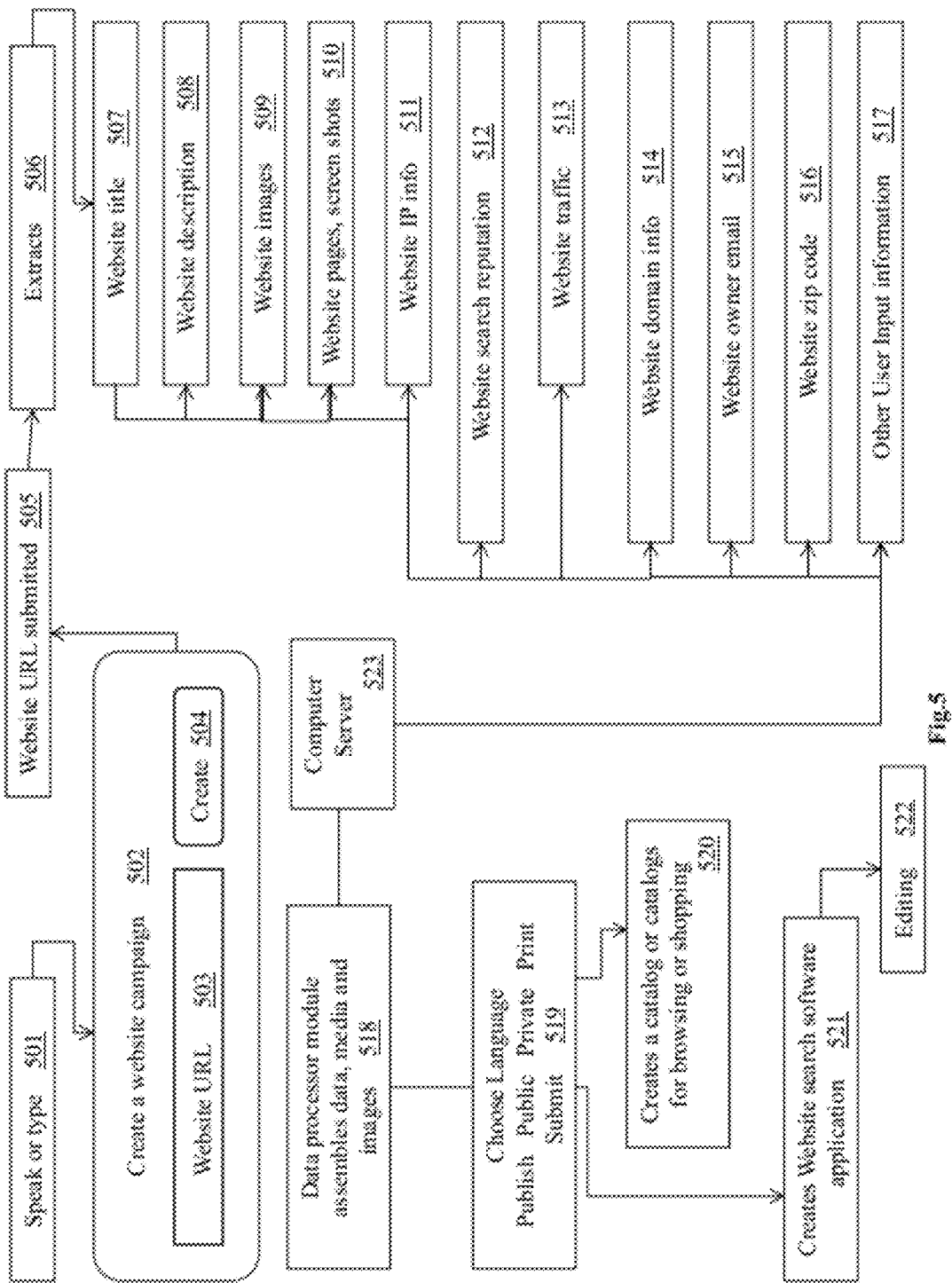
FIG. 5 is a flow chart illustrating the transformation of a website to one or more catalogs.

FIG. 5 is a flow chart illustrating the transformation of a website to one or more catalogs. A user would first speak or type 501 into a computer or equivalent device running the software executing the method, which ties the software comprising the process steps to a computer for execution. The graphical user interface (GUI) is a website campaign manager 502 located on/at a website URL 503. A user creates a campaign 504 and submits their website URL 505. The system of the present invention then extracts 506 from the URL, the website title 507, description 508, images 509, pages and screen shots 510, IP information 511, the search reputation 512, traffic 513, domain information 514, owner's email 515, zip code 516, and any other information input by the user 517. Zip codes 516 are extracted from a search made of the administrator of the domain name, through a "WHOIS" search. Reputation 512 is obtained from third party providers of free, global web metrics.

A data processor module 518, running on a computer or equivalent machine, assembles the extracted information on a computer server 523. The system provides a language selection option where the final product can be created using one or more languages and then published, publically or privately, printed, and submitted for creation 519.

Finally, one or more catalogs are created for browsing or shopping 520 along with a complementary website search software application 521 which can later be edited 522.

Figure 6:
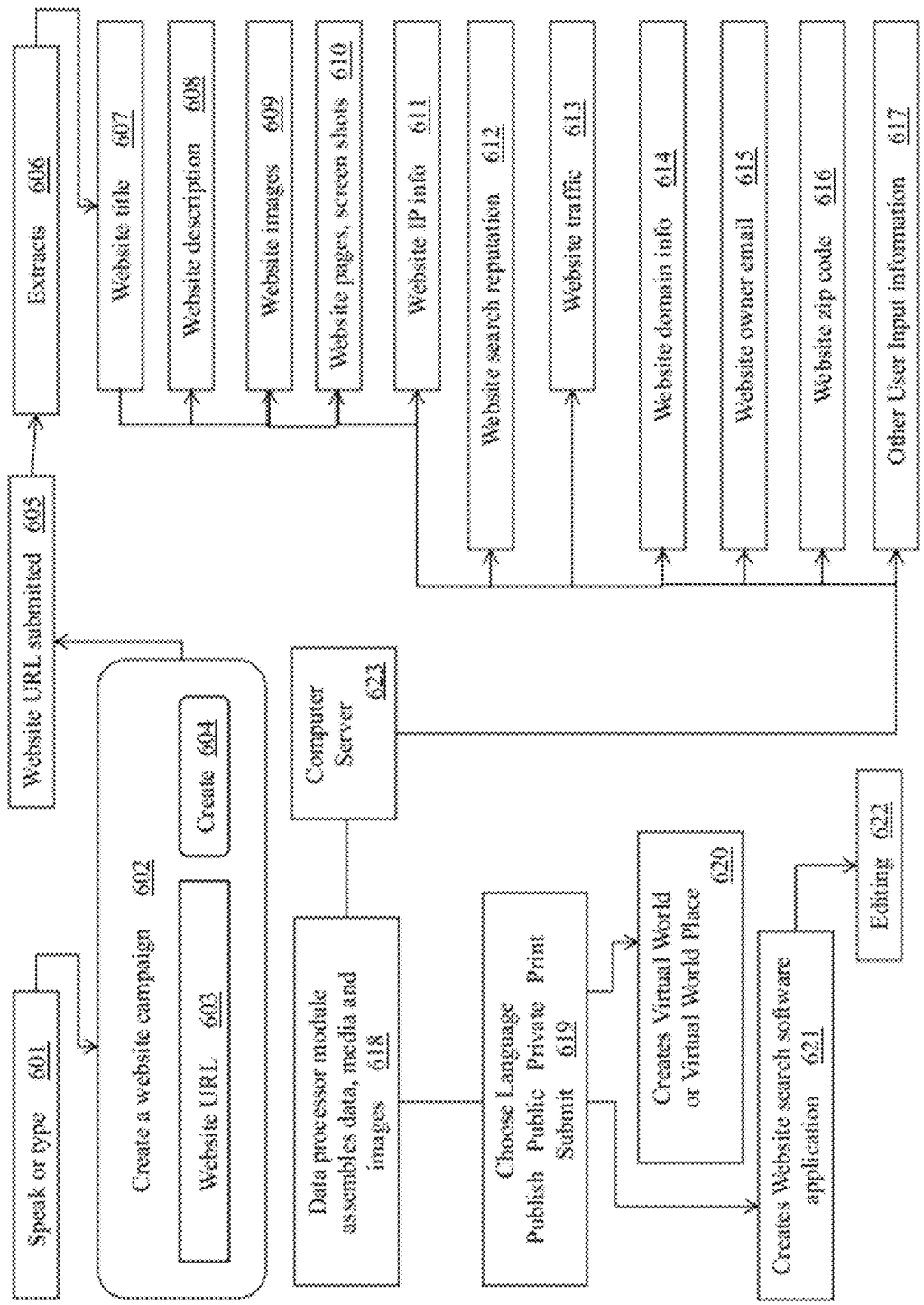
FIG. 6 is a flow chart illustrating the transformation of a website for use in a virtual world or place.

FIG. 6 is a flow chart illustrating the transformation of a website for use in a virtual world or place. A user would first speak or type 601 into a computer or equivalent device running the software executing the method, which ties the software comprising the process steps to a computer for execution. The graphical user interface (GUI) is a website campaign manager 602 located on/at a website URL 603. A user creates a campaign 104 and submits their website URL 605. The system of the present invention then extracts 606 from the URL, the website title 607, description 608, images 609, pages and screen shots 610, IP information 611, the search reputation 612, traffic 613, domain information 614, owner's email 615, zip code 616, and any other information input by the user 617. Zip codes 616 are extracted from a search made of the administrator of the domain name, through a "WHOIS" search. Reputation 612 is obtained from third party providers of free, global web metrics.

A data processor module 618, running on a computer or equivalent machine, assembles the extracted information on a computer server 623. The system provides a language selection option where the final product can be created using one or more languages and then published, publically or privately, printed, and submitted for creation 619.

Finally, one or more virtual worlds or virtual world places is created 620 along with a complementary website search software application 621 which can later be edited 622.

Figure 7:
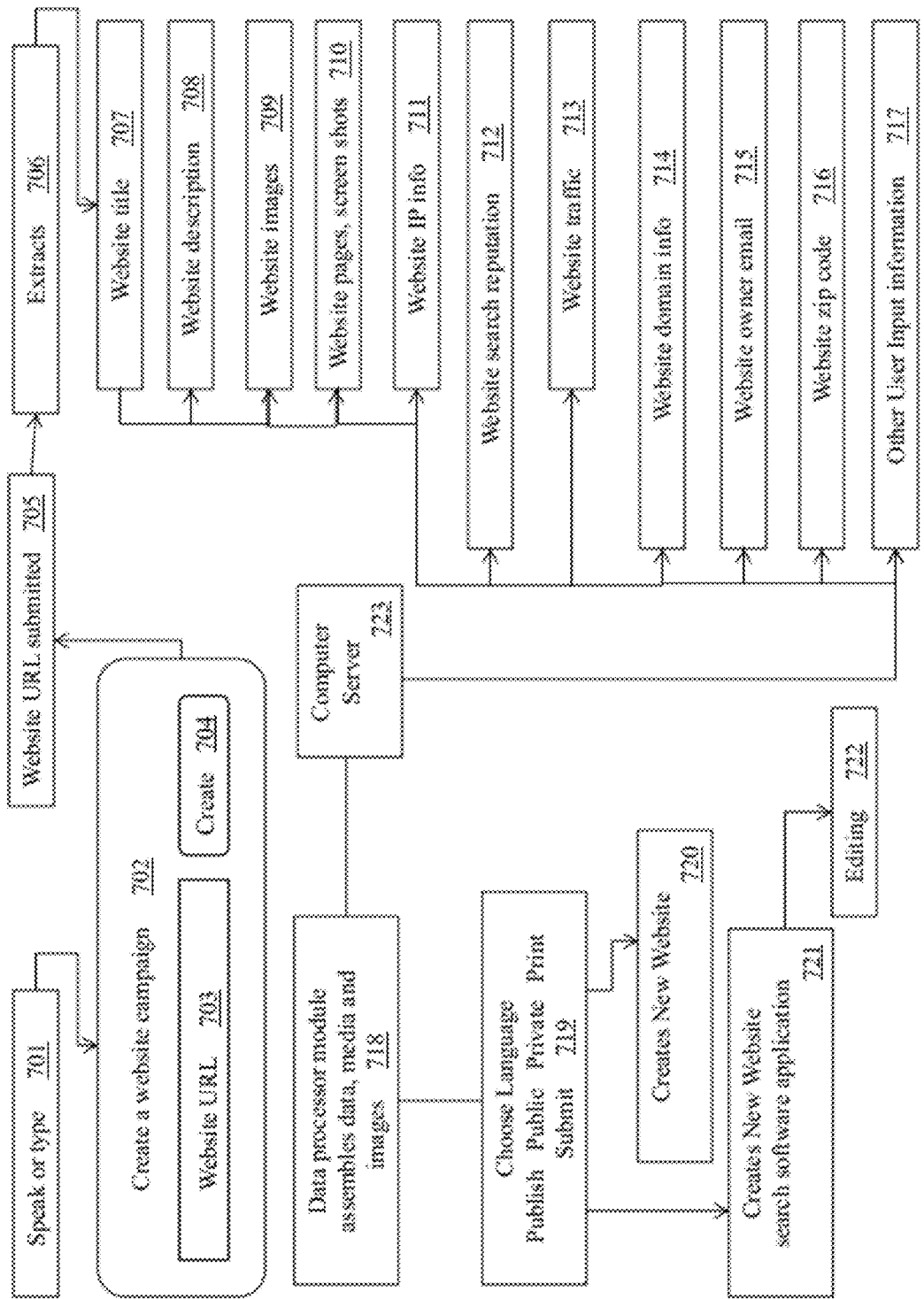
FIG. 7 is a flow chart illustrating a transformation of a website to another website for design, functionality, or profitability.

FIG. 7 is a flow chart illustrating a transformation of a website to another website for design, functionality, or profitability. A user would first speak or type 701 into a computer or equivalent device running the software executing the method, which ties the software comprising the process steps to a computer for execution. The graphical user interface (GUI) is a website campaign manager 702 located on/at a website URL 703. A user creates a campaign 704 and submits their website URL 705. The system of the present invention then extracts 706 from the URL, the website title 707, description 708, images 709, pages and screen shots 710, IP information 711, the search reputation 712, traffic 713, domain information 714, owner's email 715, zip code 716, and any other information input by the user 717. Zip codes 716 are extracted from a search made of the administrator of the domain name, through a "WHOIS" search. Reputation 712 is obtained from third party providers of free, global web metrics.

A data processor module 718, running on a computer or equivalent machine, assembles the extracted information on a computer server 723. The system provides a language selection option where the final product can be created using one or more languages and then published, publically or privately, printed, and submitted for creation 719.

Finally, one or more new websites are created 720 along with a complementary website search software application 721 which can later be edited 722.

Figure 8:
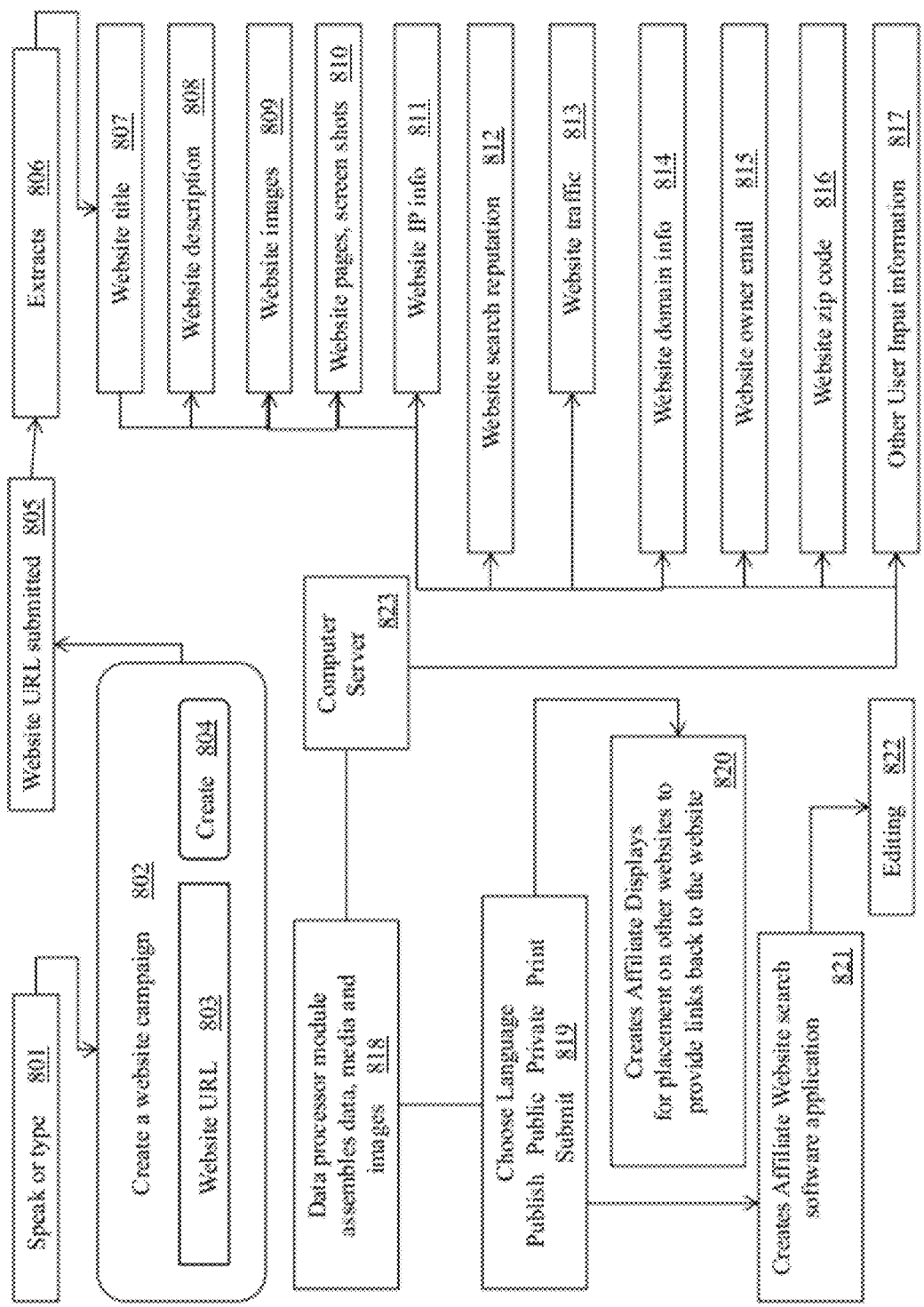
FIG. 8 is a flow chart illustrating transformation of website to affiliate software application and process.

FIG. 8 is a flow chart illustrating transformation of website to affiliate software application and process. A user would first speak or type 801 into a computer or equivalent device running the software executing the method, which ties the software comprising the process steps to a computer for execution. The graphical user interface (GUI) is a website campaign manager 802 located on/at a website URL 803. A user creates a campaign 804 and submits their website URL 805. The system of the present invention then extracts 806 from the URL, the website title 807, description 808, images 809, pages and screen shots 810, IP information 811, the search reputation 812, traffic 813, domain information 814, owner's email 815, zip code 816, and any other information input by the user 817. Zip codes 816 are extracted from a search made of the administrator of the domain name, through a "WHOIS" search. Reputation 812 is obtained from third party providers of free, global web metrics.

A data processor module 818, running on a computer or equivalent machine, assembles the extracted information on a computer server 823. The system provides a language selection option where the final product can be created using one or more languages and then published, publically or privately, printed, and submitted for creation 819.

Finally, one or more affiliate displays for placement on other websites to provide links back to the website are created 820 along with a complementary website search software application 821 which can later be edited 822.

Figure 9:
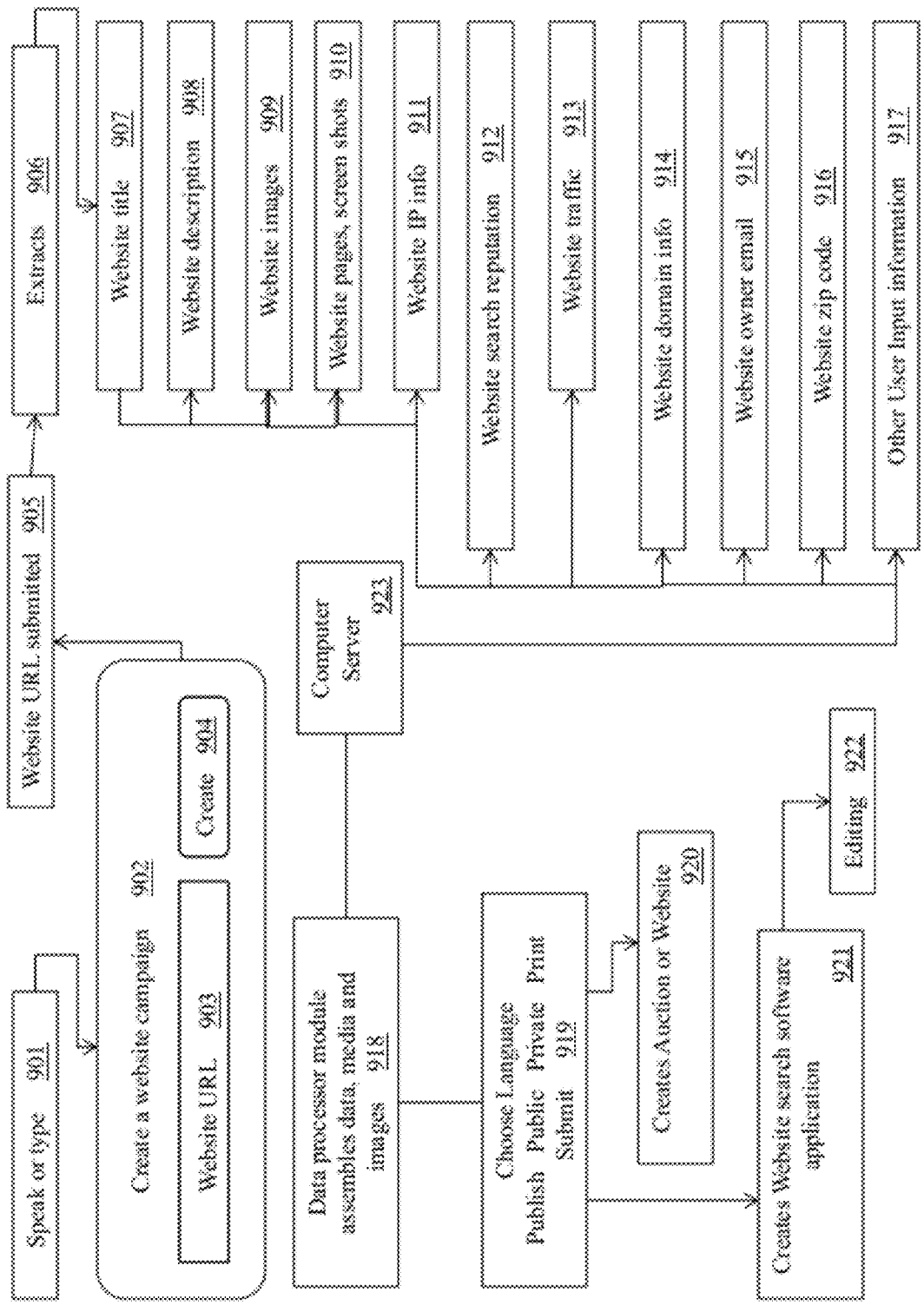
FIG. 9 is a flow chart illustrating the transformation of a website to an auction or sales site.

FIG. 9 is a flow chart illustrating the transformation of a website to an auction or sales site. A user would first speak or type 901 into a computer or equivalent device running the software executing the method, which ties the software comprising the process steps to a computer for execution. The graphical user interface (GUI) is a website campaign manager 902 located on/at a website URL 903. A user creates a campaign 904 and submits their website URL 905. The system of the present invention then extracts 906 from the URL, the website title 907, description 908, images 909, pages and screen shots 910, IP information 911, the search reputation 912, traffic 913, domain information 914, owner's email 915, zip code 916, and any other information input by the user 917. Zip codes 916 are extracted from a search made of the administrator of the domain name, through a "WHOIS" search. Reputation 912 is obtained from third party providers of free, global web metrics.

A data processor module 918, running on a computer or equivalent machine, assembles the extracted information on a computer server 923. The system provides a language selection option where the final product can be created using one or more languages and then published, publically or privately, printed, and submitted for creation 919.

Finally, one or more affiliate displays for placement on other websites to provide links back to the website auction or websites are created 920 along with a complementary website search software application 921 which can later be edited 922.

Figure 10:
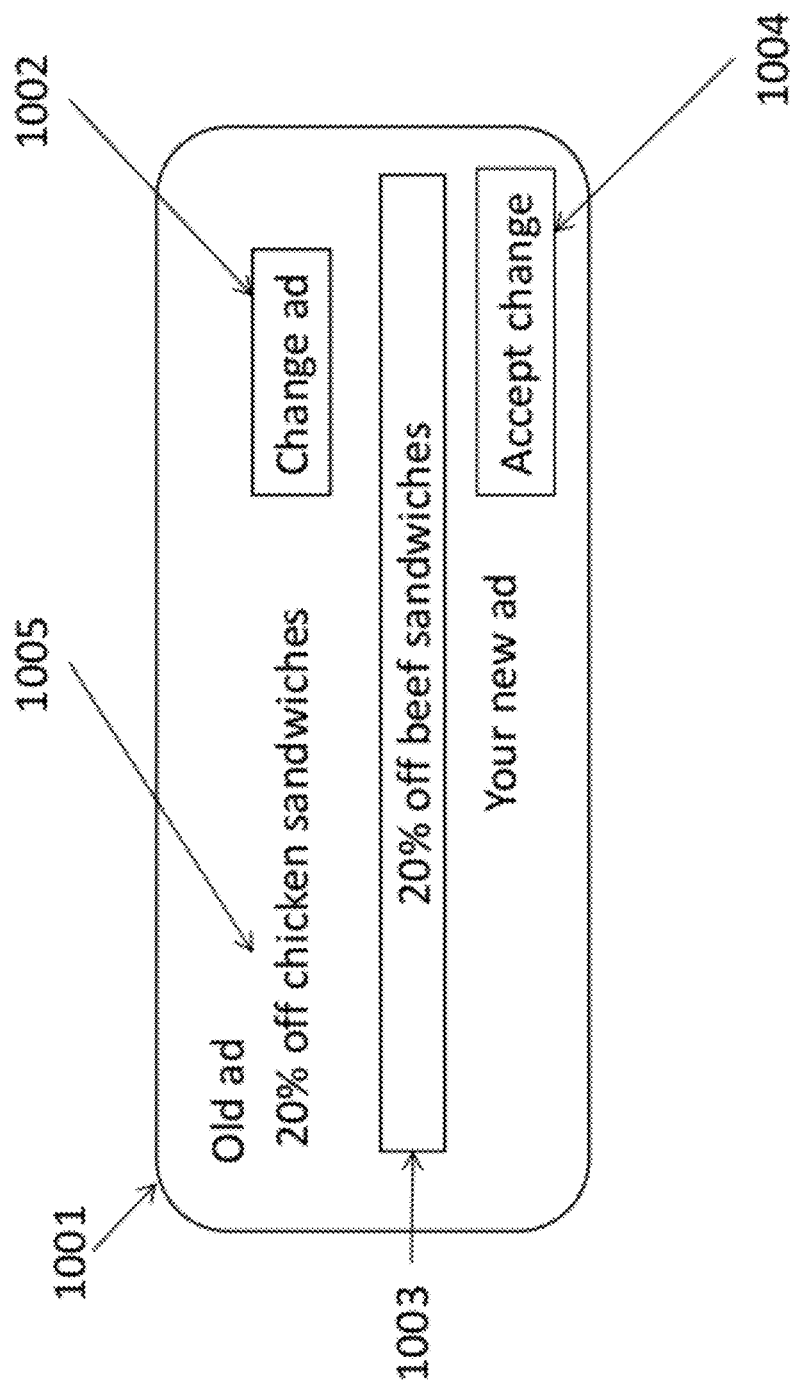
FIG. 10 is an advertising or campaign editor front end for image, media, and text data illustrating a window for proposing and accepting a substituted advertisement.

FIG. 10 is an advertising or campaign editor front end for image, media, and text data illustrating a window 1001 for proposing and accepting a substituted advertisement 1003. The old advertisement 1005, are current one running, is displayed and a change button 1002 is presented for a user to initiate a change. An accept button 1004 is presented for a user to accept the new advertisement 1003 from which the old advertisement 1005 is to be changed. The campaign or ad offer is embedded in the QR code. The offer can be changed at any time, for testing and variable pricing campaigns. Thus, if a business runs out of an item a different item can be substituted easily and quickly.

Figure 11:
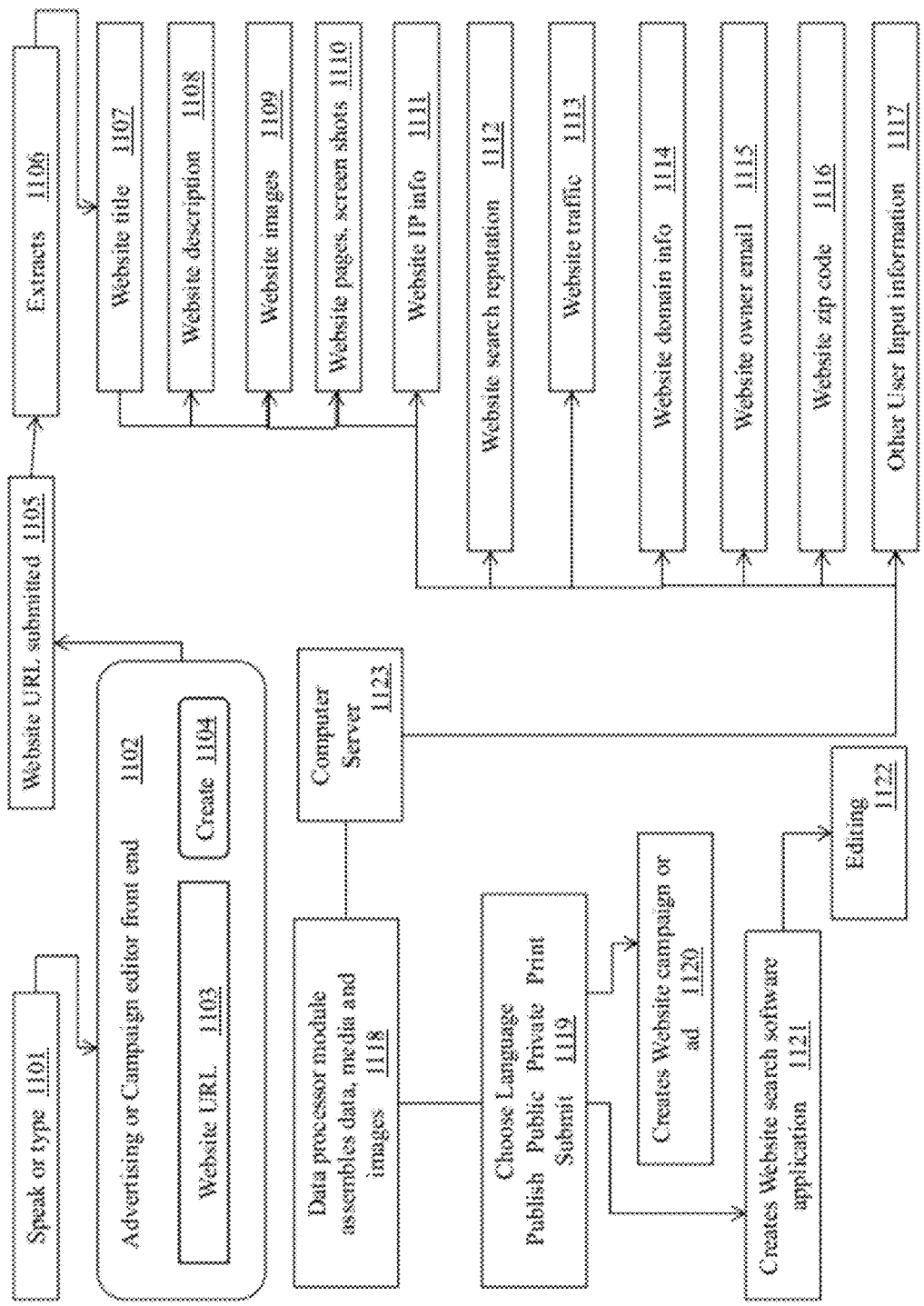
FIG. 11 is a flow chart illustrating an advertising or campaign editor for images, media, and text data.

FIG. 11 is a flow chart illustrating an advertising or campaign editor for images, media, and text data. A user would first speak or type 1101 into a computer or equivalent device running the software executing the method, which ties the software comprising the process steps to a computer for execution. The graphical user interface (GUI) is an advertising or campaign editor front end 1102 located on/at a website URL 1103. A user creates a campaign 1104 and submits their website URL 1105. The system of the present invention then extracts 1106 from the URL, the website title 1107, description 1108, images 1109, pages and screen shots 1110, IP information 1111, the search reputation 1112, traffic 1113, domain information 1114, owner's email 1115, zip code 1116, and any other information input by the user 1117. Zip codes 1116 are extracted from a search made of the administrator of the domain name, through a "WHOIS" search. Reputation 1112 is obtained from third party providers of free, global web metrics.

A data processor module 1118, running on a computer or equivalent machine, assembles the extracted information on a computer server 1123. The system provides a language selection option where the final product can be created using one or more languages and then published, publically or privately, printed, and submitted for creation 1119.

Finally, one or more website campaigns or advertisements are created 1120 along with a complementary website search software application 1121 which can later be edited 1122.

Figure 12:
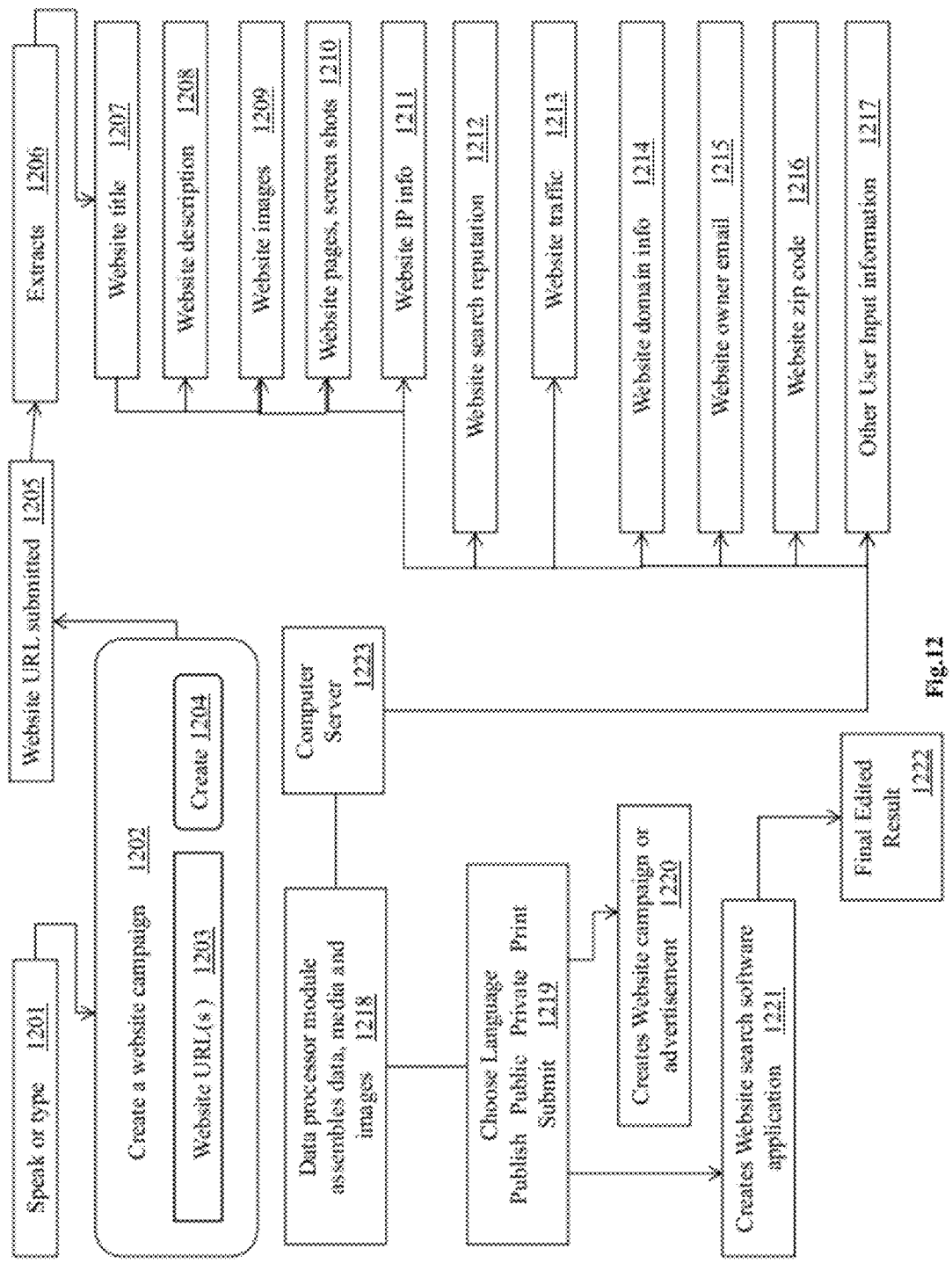
FIG. 12 is a flow chart illustrating a website URL submitter form.

FIG. 12 is a flow chart illustrating a website URL submitter form. A user would first speak or type 1201 into a computer or equivalent device running the software executing the method, which ties the software comprising the process steps to a computer for execution. The graphical user interface (GUI) is a website campaign editor front end 1202 located on/at one or more website URLs 1203. A user creates a campaign 1204 and submits their website URL 1205. The system of the present invention then extracts 1206 from the URL, the website title 1207, description 1208, images 1209, pages and screen shots 1210, IP information 1211, the search reputation 1212, traffic 1213, domain information 1214, owner's email 1215, zip code 1216, and any other information input by the user 1217. Zip codes 1216 are extracted from a search made of the administrator of the domain name, through a "WHOIS" search. Reputation 1212 is obtained from third party providers of free, global web metrics.

A data processor module 1218, running on a computer or equivalent machine, assembles the extracted information on a computer server 1223. The system provides a language selection option where the final product can be created using one or more languages and then published, publically or privately, printed, and submitted for creation 1219.

Finally, one or more website campaigns or advertisements are created 1220 along with a complementary website search software application 1221 which can later be edited 1222.

Figure 13:
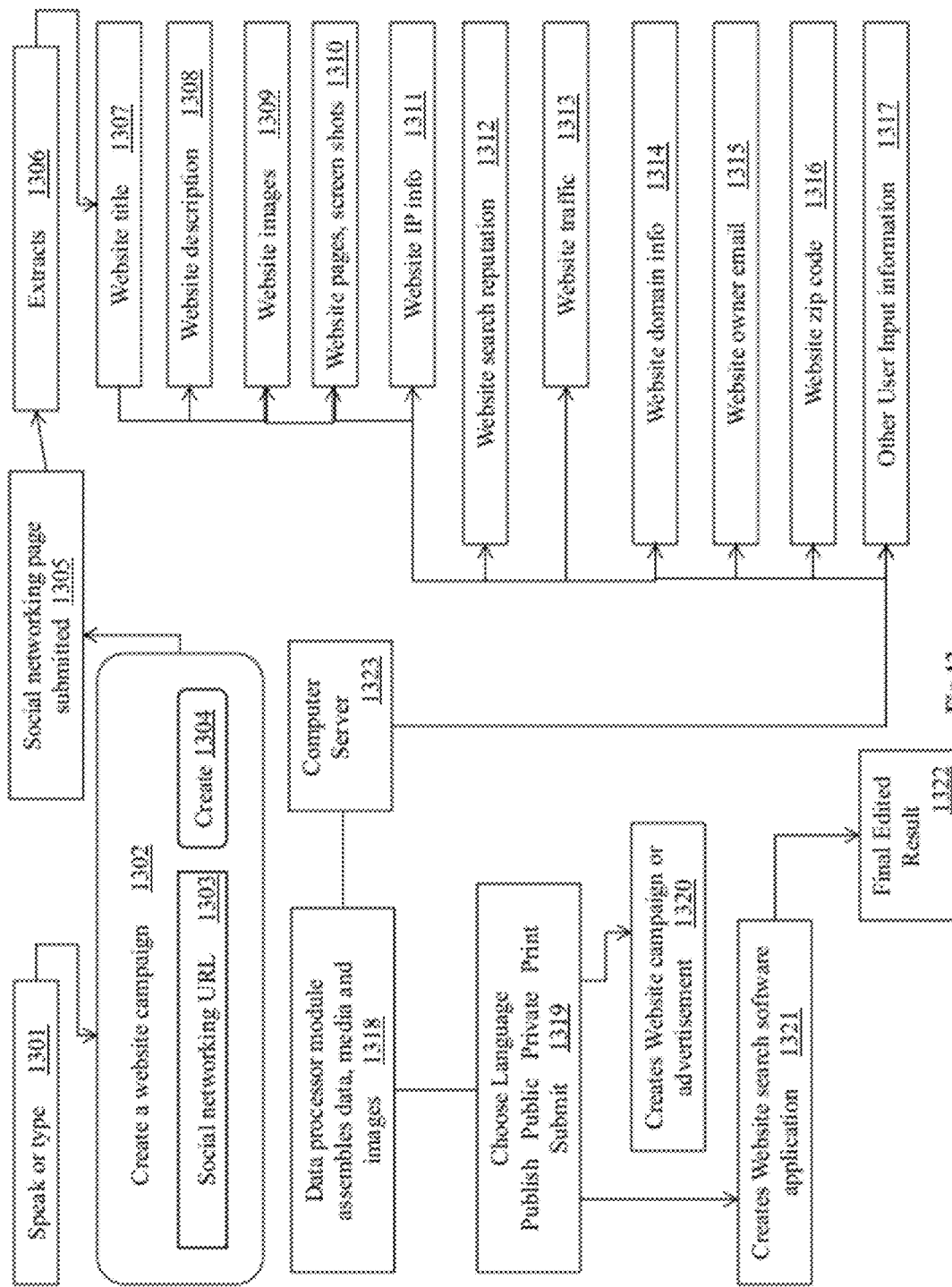
FIG. 13 is a flow chart illustrating the transformation of social networking pages to one or more advertisements.

FIG. 13 is a flow chart illustrating the transformation of social networking pages to one or more advertisements. A user would first speak or type 1301 into a computer or equivalent device running the software executing the method, which ties the software comprising the process steps to a computer for execution. The graphical user interface (GUI) is a website campaign editor front end 1302 located on/at a social networking URL 1303. A user creates a campaign 1304 and submits their social networking page 1305. The system of the present invention then extracts 1306 from the URL, the website title 1307, description 1308, images 1309, pages and screen shots 1310, IP information 1311, the search reputation 1312, traffic 1313, domain information 1314, owner's email 1315, zip code 1216, and any other information input by the user 1317. Zip codes 1316 are extracted from a search made of the administrator of the domain name, through a "WHOIS" search. Reputation 1312 is obtained from third party providers of free, global web metrics.

A data processor module 1318, running on a computer or equivalent machine, assembles the extracted information on a computer server 1323. The system provides a language selection option where the final product can be created using one or more languages and then published, publically or privately, printed, and submitted for creation 1319.

Finally, one or more website campaigns or advertisements are created 1320 along with a complementary website search software application 1321 which can later be edited 1322.

Figure 14:
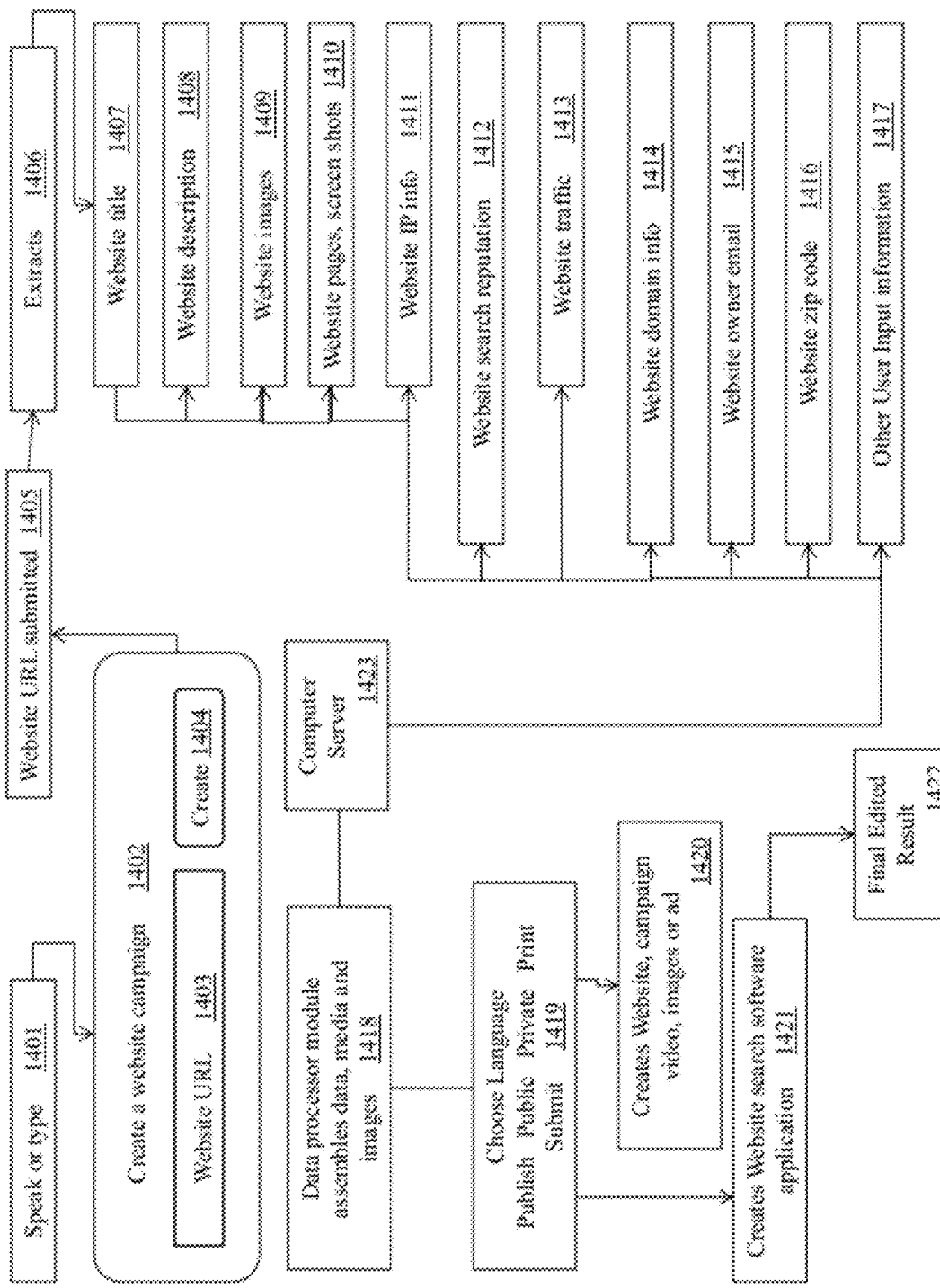
FIG. 14 is a flow chart illustrating the transformation of one or more words to a website, campaign, advertisement, or video.

FIG. 14 is a flow chart illustrating the transformation of one or more words to a website, campaign, advertisement, or video. A user would first speak or type 1401 into a computer or equivalent device running the software executing the method, which ties the software comprising the process steps to a computer for execution. The graphical user interface (GUI) is a website campaign editor front end 1402 located on/at a website URL 1403. A user creates a campaign 1404 and submits their website URL 1405. The system of the present invention then extracts 1406 from the URL, the website title 1407, description 1408, images 1409, pages and screen shots 1410, IP information 1411, the search reputation 1412, traffic 1413, domain information 1414, owner's email 1415, zip code 1416, and any other information input by the user 1417. Zip codes 1416 are extracted from a search made of the administrator of the domain name, through a "WHOIS" search. Reputation 1412 is obtained from third party providers of free, global web metrics.

A data processor module 1418, running on a computer or equivalent machine, assembles the extracted information on a computer server 1423. The system provides a language selection option where the final product can be created using one or more languages and then published, publically or privately, printed, and submitted for creation 1419.

Finally, one or more websites, campaigns, videos, images, or advertisements are created 1420 along with a complementary website search software application 1421 which can later be edited 1422.

Figure 15:
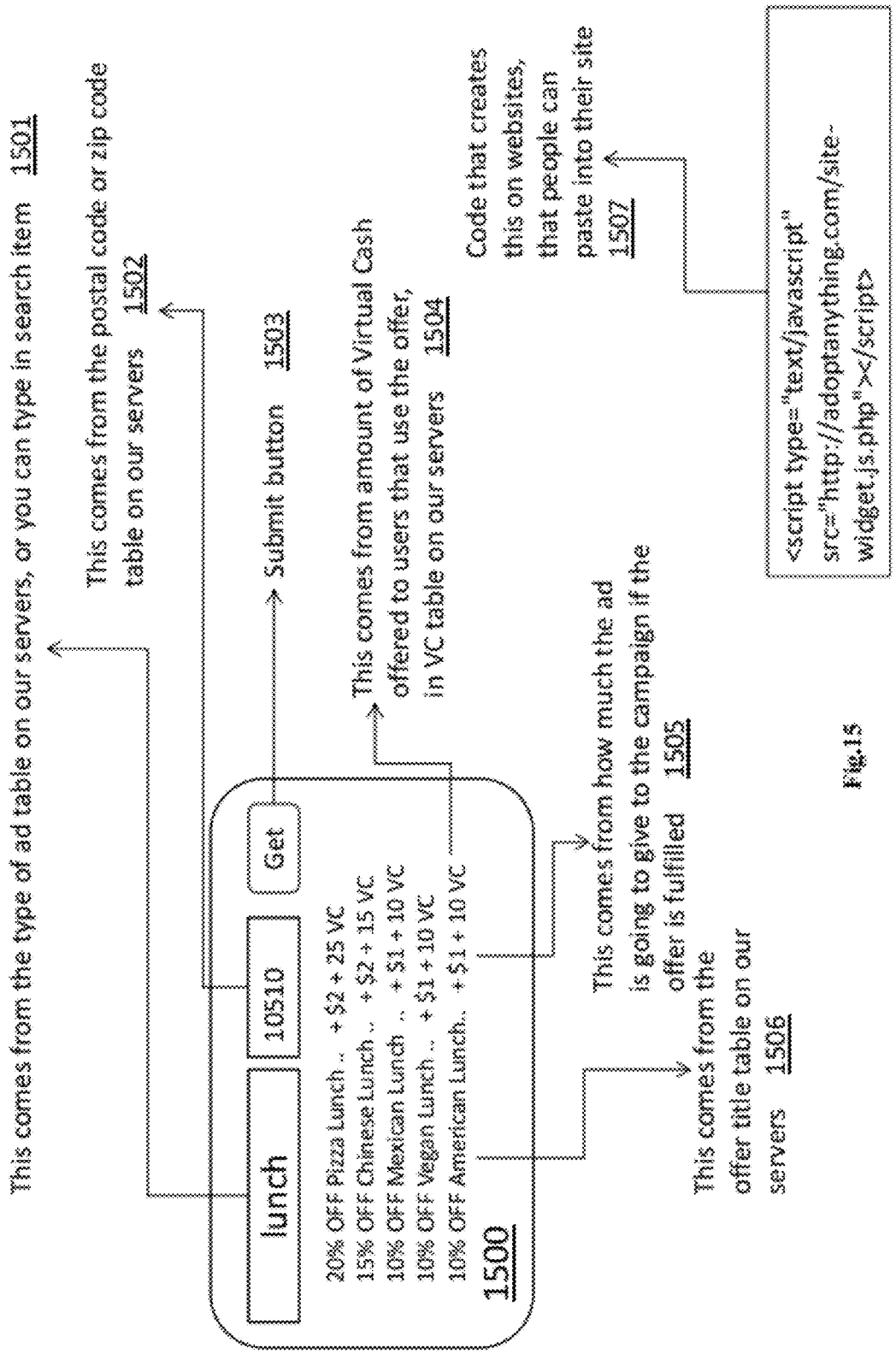
FIG. 15 is an illustration of the website search software application module of the present invention.

FIG. 15 is an illustration of the website search software application module 1500 of the present invention. The website search software application module 1500 is generated either by tables on the servers of the present invention or by the entry of a search item 1501. The postal or zip code is generated by a table located within the server. When a submit button 1503 is selected, a search is performed based on the type of ad 1501 and postal code 1502 entered. Results are then generated from the title table in the system server 1506, and the price for each offer is determined by how much the advertisement is going to give the associated campaign 1505. The amount of virtual cash offered to a user for using the advertisement is also generated by a table within the server 1504. The system also generates code that can be pasted into other websites 1507.

Figure 16:
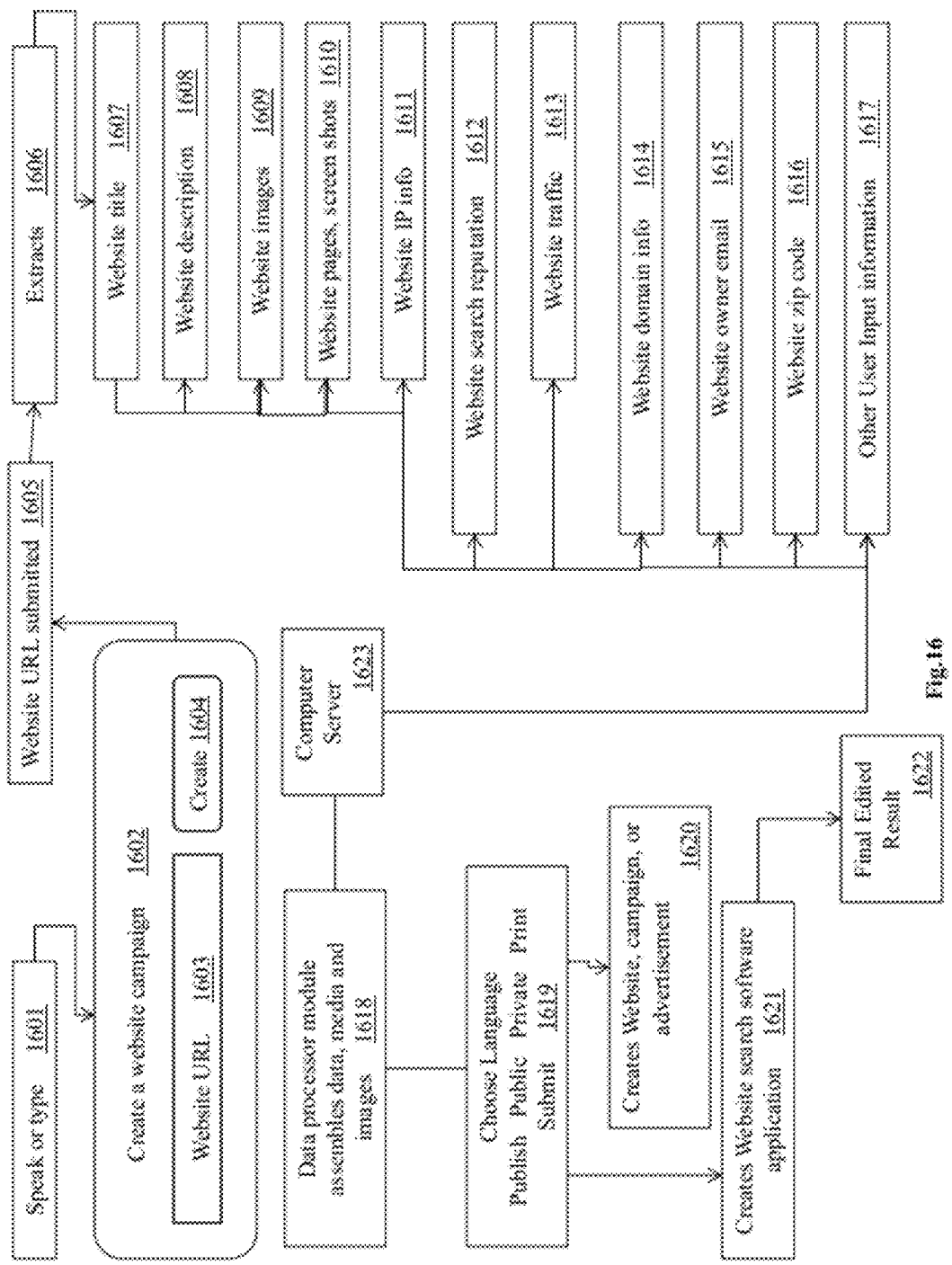
FIG. 16 is a flow chart illustrating a mobile application for publishing merchandise, to a webpage or one or more catalogs.

FIG. 16 is a flow chart illustrating a mobile application for publishing merchandise, to a webpage or one or more catalogs. A user would first speak or type 1601 into a computer or equivalent device running the software executing the method, which ties the software comprising the process steps to a computer for execution. The graphical user interface (GUI) is a website campaign editor front end 1602 located on/at a website URL 1603. A user creates a campaign 1604 and submits their website URL 1605. The system of the present invention then extracts 1606 from the URL, the website title 1607, description 1608, images 1609, pages and screen shots 1610, IP information 1611, the search reputation 1612, traffic 1613, domain information 1614, owner's email 1615, zip code 1616, and any other information input by the user 1617. Zip codes 1616 are extracted from a search made of the administrator of the domain name, through a "WHOIS" search. Reputation 1612 is obtained from third party providers of free, global web metrics.

A data processor module 1618, running on a computer or equivalent machine, assembles the extracted information on a computer server 1623. The system provides a language selection option where the final product can be created using one or more languages and then published, publically or privately, printed, and submitted for creation 1619.

Finally, one or more websites, campaigns, or advertisements are created 1620 along with a complementary website search software application 1621 which can later be edited 1622.

Figure 17:
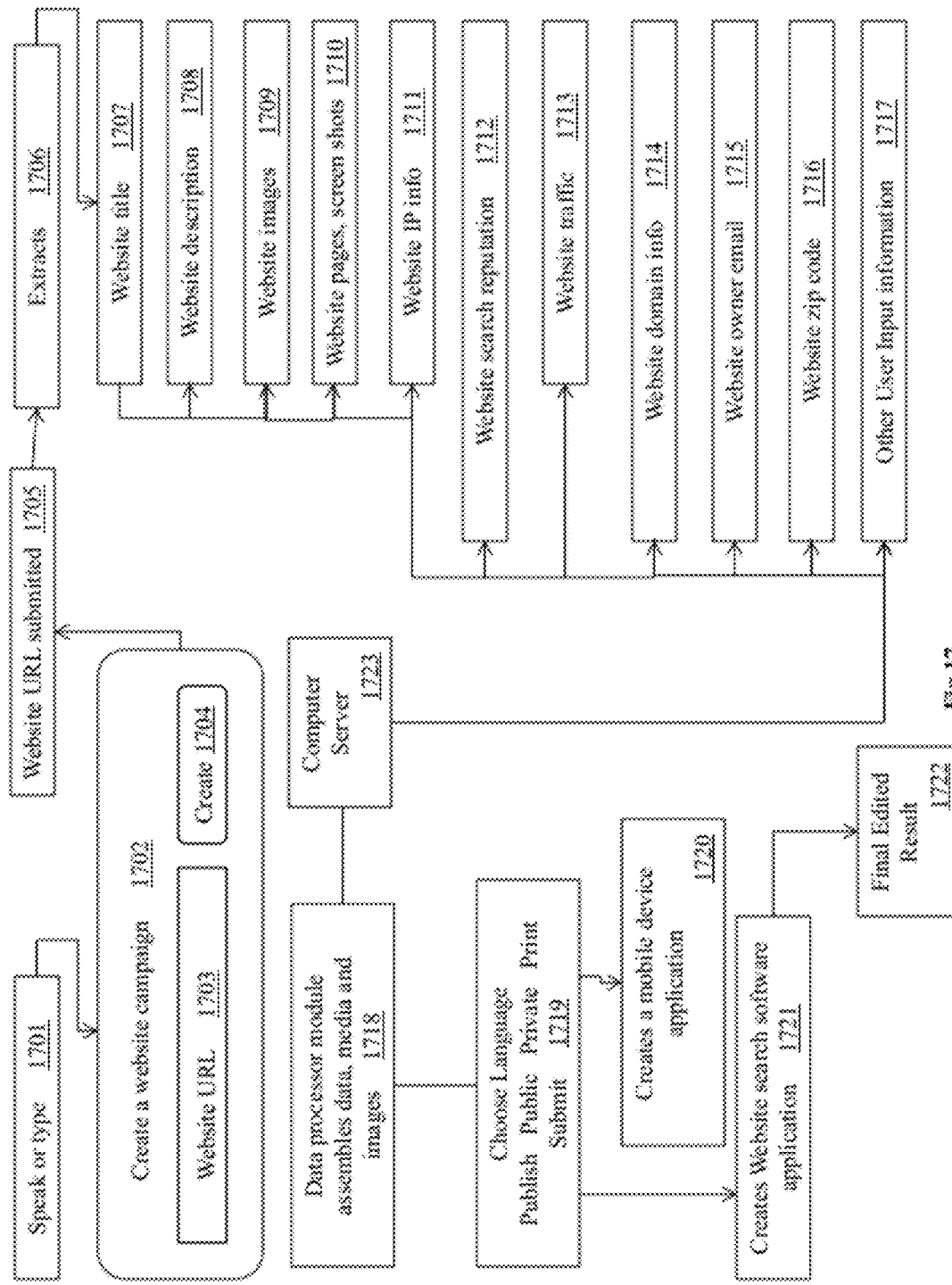
FIG. 17 is a flow chart illustrating the transformation of a website to a mobile device application.

FIG. 17 is a flow chart illustrating the transformation of a website to a mobile device application. A user would first speak or type 1701 into a computer or equivalent device running the software executing the method, which ties the software comprising the process steps to a computer for execution. The graphical user interface (GUI) is a website campaign editor front end 1702 located on/at a website URL 1703. A user creates a campaign 1704 and submits their website URL 1705. The system of the present invention then extracts 1706 from the URL, the website title 1707, description 1708, images 1709, pages and screen shots 1710, IP information 1711, the search reputation 1712, traffic 1713, domain information 1714, owner's email 1715, zip code 1716, and any other information input by the user 1717. Zip codes 1716 are extracted from a search made of the administrator of the domain name, through a "WHOIS" search. Reputation 1712 is obtained from third party providers of free, global web metrics.

A data processor module 1718, running on a computer or equivalent machine, assembles the extracted information on a computer server 1723. The system provides a language selection option where the final product can be created using one or more languages and then published, publically or privately, printed, and submitted for creation 1719.

Finally, one or more mobile device applications are created 1720 along with a complementary website search software application 1721 which can later be edited 1722.

Figure 18:
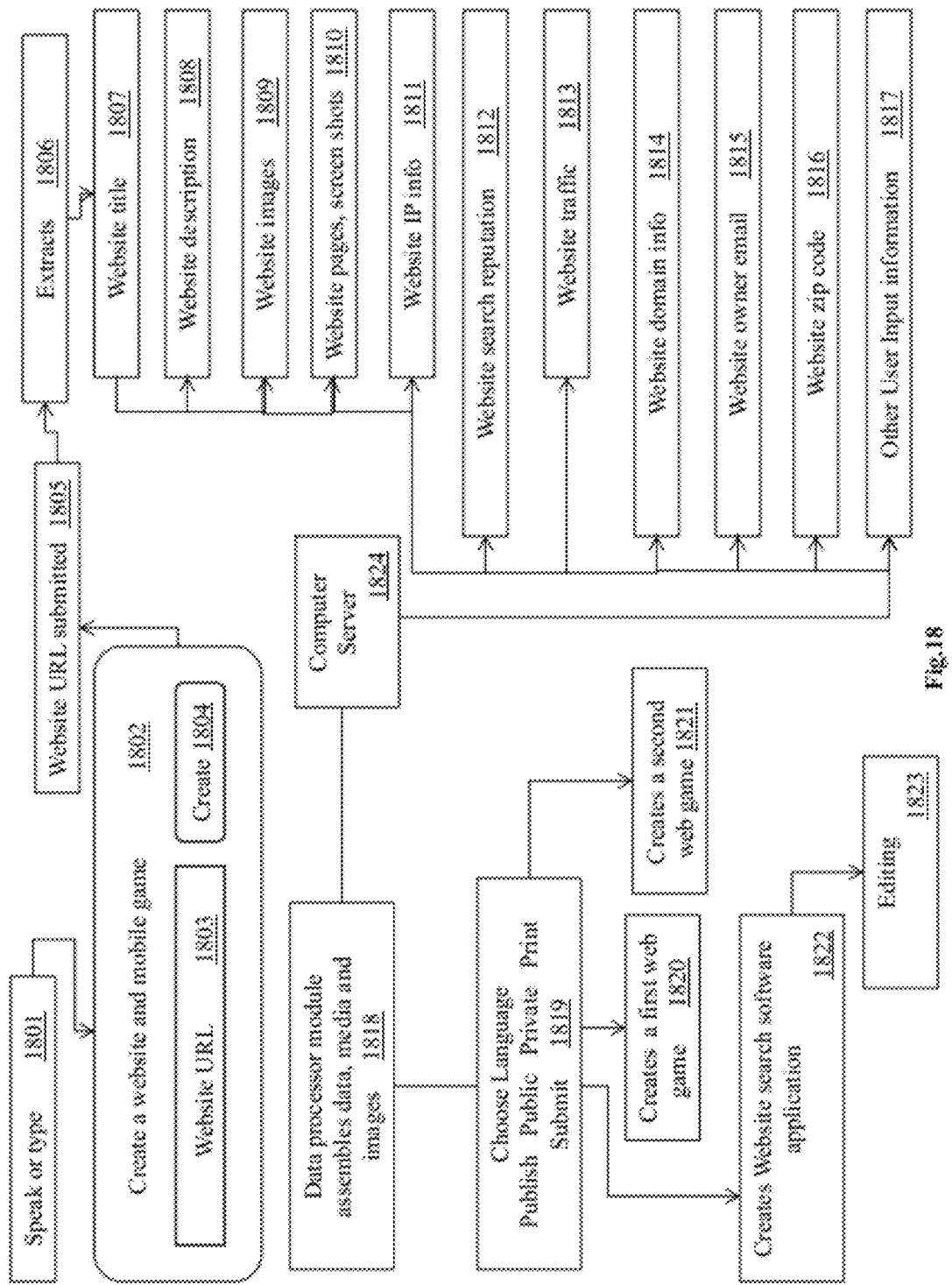
FIG. 18 is a flow chart illustrating the transformation of a website to a game.

FIG. 18 is a flow chart illustrating the transformation of a website to a game. A user would first speak or type 1801 into a computer or equivalent device running the software executing the method, which ties the software comprising the process steps to a computer for execution. The graphical user interface (GUI) is a website campaign editor front end 1802 located on/at a website URL 1803. A user creates a campaign 1804 and submits their website URL 1805. The system of the present invention then extracts 1806 from the URL, the website title 1807, description 1808, images 1809, pages and screen shots 1810, IP information 1811, the search reputation 1812, traffic 1813, domain information 1814, owner's email 1815, zip code 1816, and any other information input by the user 1817. Zip codes 1816 are extracted from a search made of the administrator of the domain name, through a "WHOIS"

search. Reputation 1812 is obtained from third party providers of free, global web metrics.

A data processor module 1818, running on a computer or equivalent machine, assembles the extracted information on a computer server 1824. The system provides a language selection option where the final product can be created using one or more languages and then published, publically or privately, printed, and submitted for creation 1819.

Finally, a first web game is created 1820, a second web game is created 1821 along with a complementary website search software application 1822 which can later be edited 1823.

Figure 19:
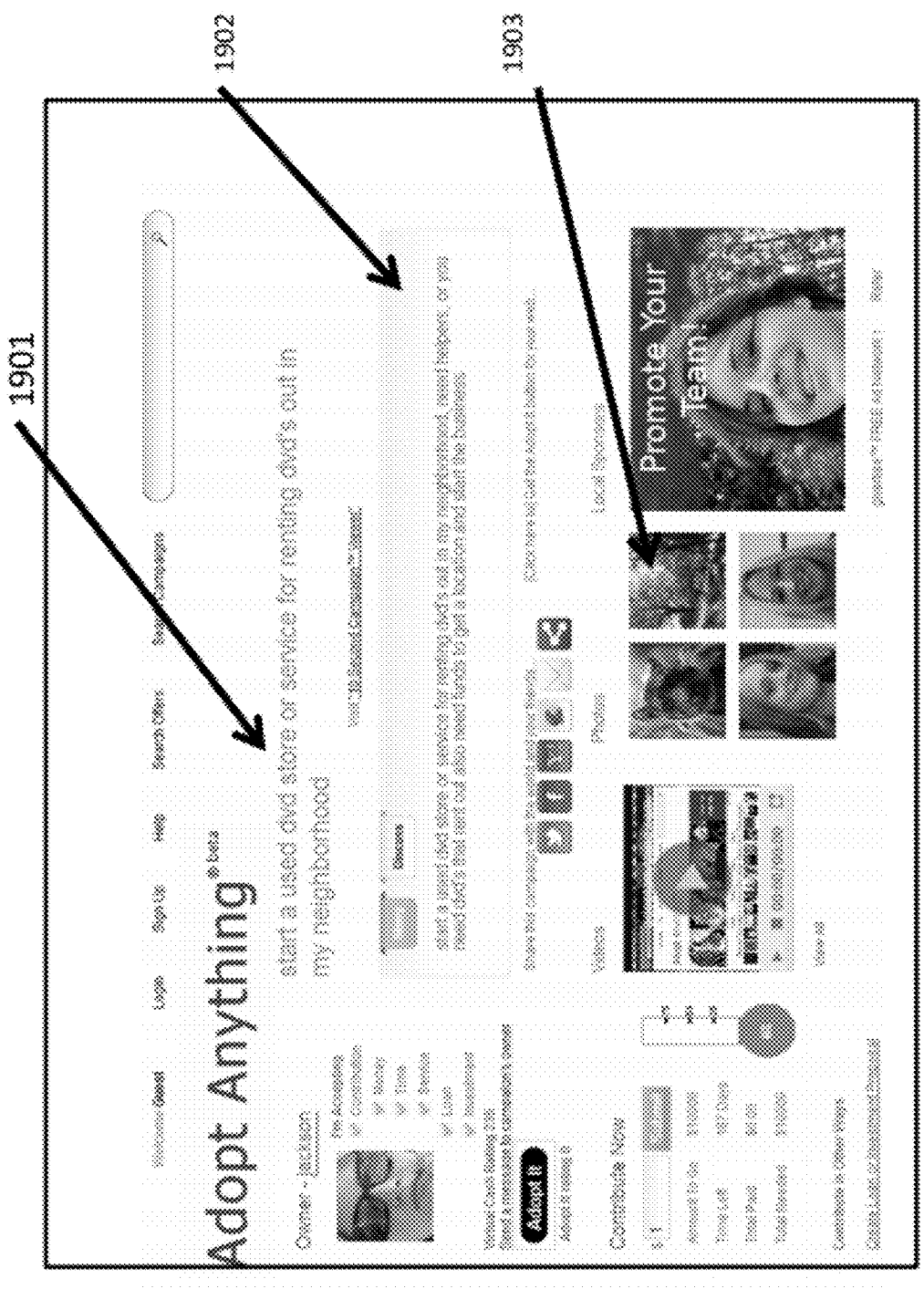
FIGS. 19-20 are exemplary screen shots of a website campaign page created by the method of the present invention.
Figure 20:

Now referring to FIGS. 19-20, exemplary screen shots of a website campaign page created by the method of the present invention are shown. Website meta tag information 1901 is displayed on the created website campaign screen. A screenshot of the homepage with a website description form the meta tag information and/or about us page 1902 is also shown in this example. Additionally, thumbnail images 1903 that link to other website pages of the website can be shown on the campaign page.

Figure 21:
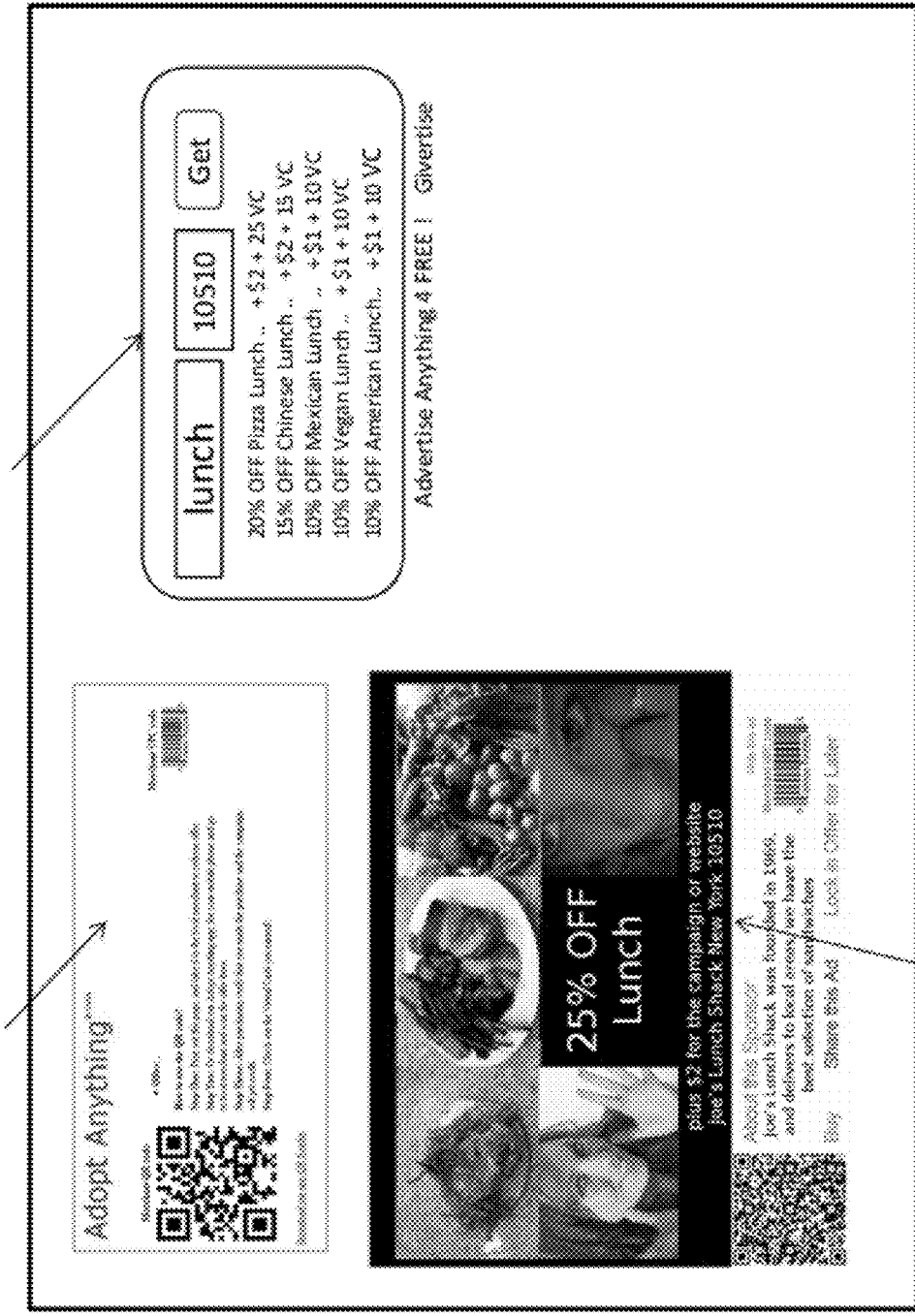
FIG. 21 is an exemplary screen shot of a gifting method created by the present invention.

FIG. 21 is an exemplary screen shot of a gifting method created by the present invention. On all participating websites in the system and method of the present invention, offers 2101 are displayed in response to a search performed using the search software application module 2102. A user can click on the offer to read a bigger description and images come up 2103 and the click is recorded. A user can then lock in or print the advertisement, which is also recorded, then use their phone or print out the offer 21012 to get use. The system records and allows user to compare data with respect to clicks, lock-ins, and source purchases to initial billing.

Figure 22:
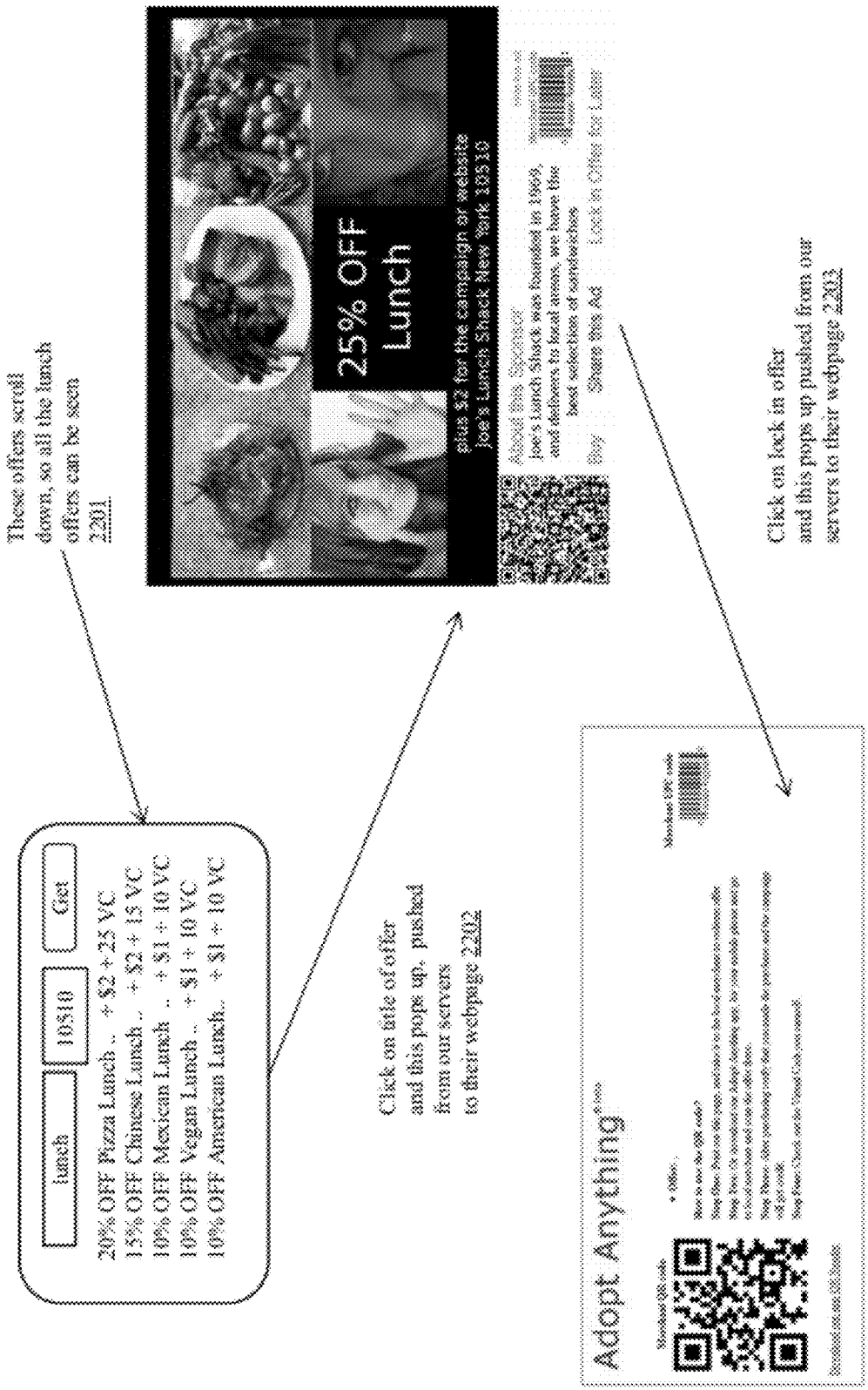
FIG. 22 is an exemplary screen shot illustrating the display and visual elements that are pushed from servers executing the present invention to the websites where the code is placed.

FIG. 22 is an exemplary screen shot illustrating the display and visual elements that are pushed from servers executing the present invention to the websites where the code is placed. In the search software application module the offers scroll down so that all the offers can be seen 2201. One a user clicks on the title of an offer, an advertisement image pops up, which is pushed from the servers to the webpage from which the user is conducting their search 2202. A user must then click on the advertisement to lock in the offer and then a redemption image pops up which is pushed from the servers to the webpage from which the user is conducting their search 2203.

Moreover, other implementations of the invention will be apparent to those skilled in the art from consideration of the specification and practice of the invention disclosed herein. Various aspects and/or components of the described embodiments may be used singly or in any combination in the computerized content filtering system. It is intended that the specification and examples be considered as exemplary only, with a true scope and spirit of the invention being indicated by the following claims.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The embodiments of the invention in which an exclusive property or privilege is claimed are defined as follows:

1. A method for transformation of a website into one or more campaign pages executed as a series of instructions on a computer system, the method comprising the steps of:
  providing a computer executing the method;
  inputting a URL location of a website into a form;
  extracting all data, media and images from the URL location of the website;
  storing all extracted data as a file in a folder and text as data in a database on a server;
  obtaining domain owner administrator information;
  storing the domain owner administrator information as a file in the folder in the database;
  processing the data to make the data viewable on a webpage;
  sending URL, website, text, or image information to the form for input;
  providing options to choose a language translator for campaign translation, to publish, make public or private, or print the campaign;
  creating a website campaign;
  creating a website search software application module either from tables on the server or by the entry of a search item; and
  providing editing and deletion of the website created page and website search software application.

2. The method in claim 1, further comprising the steps of:
  inputting and using the URL of the website;
  extracting all data, media, and images from the URL location of the website;
  storing all extracted data as a file in a folder and text as data in the database on the server;
  obtaining domain owner administrator information;
  storing the domain owner administrator information in a folder and a database;
  processing the data;
    determining what data is to be used;
    configuring the data for viewing on a webpage;
  sending URL, website, text, or image information to the form for input;
  providing options to choose language, for campaign translation, to publish, make public or private, or print the campaign;
  creating an advertisement;
  creating a website search software application module; and
  providing editing and deletion of the software application module.

3. The method in claim 1, further comprising the steps of:
  inputting and using the URL of the website with voice input into a form or typing into a form;
  extracting all data, media and images from the URL location of the website;
  storing all extracted data in a folder in the database;
  obtaining domain owner administrator information;
  storing the domain owner administrator information in a folder and a database;

processing the data;
   determining what data is to be used;
   configuring the data for viewing on a webpage;
sending URL, website, text, or image information to the form for input;
providing options to choose language, for campaign translation, to publish, make public or private, or print the campaign;
creating a video from the determined data to be used as extracted from the URL location of the website;
creating a website search software application module; and
providing editing and deletion of the software application module.

4. The method in claim 1, further comprising the steps of:
inputting and using the URL of the website with voice input into a form or typing into a form;
extracting all data, media and images from the URL location of the website;
storing all extracted data in a folder in the database;
obtaining domain owner administrator information;
storing the domain owner administrator information in a folder and a database;
processing the data;
   determining what data is to be used;
   configuring the data for viewing on a webpage;
sending URL, website, text, or image information to the form for input;
providing options to choose language, for campaign translation, to publish, make public or private, or print the campaign;
creating one or more images;
creating a website search software application module; and
providing editing and deletion of the software application module.

5. The method in claim 1, further comprising the steps of:
inputting and using the URL of the website with voice input into a form or typing into a form;
extracting all data, media and images from the URL location of the website;
storing all extracted data in a folder in the database;
obtaining domain owner administrator information;
storing the domain owner administrator information in a folder and a database;
processing the data;
   determining what data is to be used;
   configuring the data for viewing on a webpage;
sending URL, website, text, or image information to the form for input;
providing options to choose language, for campaign translation, to publish, make public or private, or print the campaign;
creating a one or more catalogs for browsing or shopping;
creating a website search software application module; and
providing editing and deletion of the software application module.

6. The method in claim 1, further comprising the steps of:
inputting and using the URL of the website with voice input into a form or typing into a form;
extracting all data, media and images from the URL location of the website;
storing all extracted data in a folder in the database;
obtaining domain owner administrator information;
storing the domain owner administrator information in a folder and a database;
processing the data;
   determining what data is to be used;
   configuring the data for viewing on a webpage;
sending URL, website, text, or image information to the form for input;
providing options to choose language, for campaign translation, to publish, make public or private, or print the campaign;
creating a virtual world or a virtual world place;
creating a website search software application module; and
providing editing and deletion of the software application module.

7. The method in claim 1, further comprising the steps of:
inputting and using the URL of the website with voice input into a form or typing into a form;
extracting all data, media and images from the URL location of the website;
storing all extracted data in a folder in the database;
obtaining domain owner administrator information;
storing the domain owner administrator information in a folder and a database;
processing the data;
   determining what data is to be used;
   configuring the data for viewing on a webpage;
sending URL, website, text, or image information to the form for input;
providing options to choose language, for campaign translation, to publish, make public or private, or print the campaign;
creating a new website;
creating a new website search software application module; and
providing editing and deletion of the software application module.

8. The method in claim 1, further comprising the steps of:
inputting and using the URL of the website with voice input into a form or typing into a form;
extracting all data, media and images from the URL location of the website;
storing all extracted data in a folder in the database;
obtaining domain owner administrator information;
storing the domain owner administrator information in a folder and a database;
processing the data;
   determining what data is to be used;
   configuring the data for viewing on a webpage;
sending URL, website, text, or image information to the form for input;
providing options to choose language, for campaign translation, to publish, make public or private, or print the campaign;
creating, by a code, one or more affiliate software application search modules on the server;
   copying the code of the affiliate software search application module from the server;
   pasting the code of the affiliate software search application module into a website;
   displaying the affiliate software application search module on a website;
   generating a commission when a sale occurs through the affiliate software search application module; and
providing editing and deletion of the software application module.

9. The method in claim 1, further comprising the steps of:
inputting and using the URL of the website with voice input into a form or typing into a form;
extracting all data, media and images from the URL location of the website;
storing all extracted data in a folder in the database;
obtaining domain owner administrator information;

storing the domain owner administrator information in a folder and a database;
processing the data;
    determining what data is to be used;
    configuring the data for viewing on a webpage;
sending URL, website, text, or image information to the form for input;
providing options to choose language, for campaign translation, to publish, make public or private, or print the campaign;
creating an auction or sales website;
creating a website search software application module; and
providing editing and deletion of the software application module.

10. The method in claim 1, further comprising the step of editing advertisements or campaigns images, media and text data.

11. The method in claim 1, further comprising the step of transforming a website, based on the submitted URL, into a campaign, advertisement, media product, or catalog.

12. The method in claim 1, further comprising the steps of:
inputting and using the URL of the website with voice input into a form or typing into a form;
extracting all data, media and images from the URL location of the website;
storing all extracted data in a folder in the database;
obtaining domain owner administrator information;
storing the domain owner administrator information in a folder and a database;
processing the data;
    determining what data is to be used;
    configuring the data for viewing on a webpage;
sending URL, website, text, or image information to the form for input;
providing options to choose language, for campaign translation, to publish, make public or private, or print the campaign;
creating a social network advertisement;
creating a website search software application module; and
providing editing and deletion of the software application module.

13. The method in claim 1, further comprising the steps of:
inputting and using the URL of the website with voice input into a form or typing into a form;
extracting all data, media and images from the URL location of the website;
storing all extracted data in a folder in the database;
obtaining domain owner administrator information;
storing the domain owner administrator information in a folder and a database;
processing the data;
    determining what data is to be used;
    configuring the data for viewing on a webpage;
sending URL, website, text, or image information to the form for input;
providing options to choose language, for campaign translation, to publish, make public or private, or print the campaign;
creating a website, a campaign, an advertisement, or a video from the determined data to be used as extracted from the URL location of the website;
creating a website search software application module; and
providing editing and deletion of the software application module.

14. The method in claim 1, further comprising the step of publishing merchandise to a webpage or a catalog.

15. The method in claim 1, further comprising the steps of:
inputting and using the URL of the website with voice input into a form or typing into a form;
extracting all data, media and images from the URL location of the website;
storing all extracted data in a folder in the database;
obtaining domain owner administrator information;
storing the domain owner administrator information in a folder and a database;
processing the data;
    determining what data is to be used;
    configuring the data for viewing on a webpage;
sending URL, website, text, or image information to the form for input;
providing options to choose language, for campaign translation, to publish, make public or private, or print the campaign;
creating a software application for a mobile device;
creating a website search software application module; and
providing editing and deletion of the software application module.

16. The method in claim 1, further comprising the steps of:
inputting and using the URL of the website with voice input into a form or typing into a form;
extracting all data, media and images from the URL location of the website;
storing all extracted data in a folder in the database;
obtaining domain owner administrator information;
storing the domain owner administrator information in a folder and a database;
processing the data;
    determining what data is to be used;
    configuring the data for viewing on a webpage;
sending URL, website, text, or image information to the form for input;
providing options to choose language, for campaign translation, to publish, make public or private, or print the campaign;
creating a web game;
creating a website search software application module; and
providing editing and deletion of the software application module.

17. The method in claim 1, wherein voice input or typing input is used for entering a URL of a website into the form.

18. The method in claim 1, further comprising the steps of:
generating results from a title table in the system server by the website search software application module;
determining a price for each offer based upon how much the an advertisement is going to give an associated campaign;
generating the amount of virtual cash offered to a user for using the advertisement; and
generating code that can be pasted into other websites.

* * * * *